United States Patent [19]
Asano

[11] Patent Number: 5,604,721
[45] Date of Patent: Feb. 18, 1997

[54] DEVICE FOR PLAYING BACK DISKS INCLUDING THE DETECTION OF A MAGAZINE CARRIAGE WHICH IS SIMULTANEOUSLY CARRYING TWO DISKS

[75] Inventor: Michihiro Asano, Tokyo, Japan

[73] Assignee: Nakamichi Corporation, Tokyo, Japan

[21] Appl. No.: 253,735

[22] Filed: Jun. 3, 1994

[30] Foreign Application Priority Data

Jun. 3, 1993 [JP] Japan ................................ 5-157913

[51] Int. Cl.⁶ ........................... G11B 17/22; G11B 15/16
[52] U.S. Cl. ............................................. 369/34; 369/54
[58] Field of Search ................................ 369/34, 36, 38, 369/53–54, 58, 178, 192

[56] References Cited

U.S. PATENT DOCUMENTS

| | | | |
|---|---|---|---|
| 4,561,078 | 12/1985 | Nakayama | 369/38 |
| 4,567,584 | 1/1986 | Kawakami | 369/38 |
| 4,653,037 | 3/1987 | Nakayama et al. | 369/38 |
| 4,796,244 | 1/1989 | Tsuruta et al. | 369/38 |
| 4,797,865 | 1/1989 | Imai et al. | 369/39 |
| 4,878,137 | 10/1989 | Yamashita et al. | 360/98.05 |
| 4,969,138 | 11/1990 | Ikedo et al. | 369/36 |
| 4,993,008 | 2/1991 | Shiba | 369/3 |
| 5,062,092 | 10/1991 | Siryj et al. | 369/38 |
| 5,123,001 | 6/1992 | Nakamichi et al. | 369/36 |
| 5,177,722 | 1/1993 | Nakamichi et al. | 369/36 |
| 5,210,728 | 5/1993 | Noguchi et al. | 369/36 |
| 5,270,989 | 12/1993 | Kimura | 369/37 |

FOREIGN PATENT DOCUMENTS

| | | |
|---|---|---|
| 0265269 | 4/1988 | European Pat. Off. . |
| 3807179 | 10/1988 | Germany . |
| 62-47893 | 3/1987 | Japan . |
| 62-83254 | 5/1987 | Japan . |
| 63-29258 | 2/1988 | Japan . |
| 63-79273 | 4/1988 | Japan . |
| 63-200354 | 8/1988 | Japan . |
| 204543 | 8/1988 | Japan .......................... 369/191 |
| 63-293756 | 11/1988 | Japan . |
| 171338 | 5/1989 | Japan . |
| 150023 | 10/1989 | Japan . |
| 156459 | 11/1989 | Japan . |
| 26542 | 2/1990 | Japan . |
| 26151 | 2/1990 | Japan . |
| 2143942 | 6/1990 | Japan . |
| 2260274 | 10/1990 | Japan . |
| 244388 | 11/1990 | Japan . |
| 316126 | 4/1991 | Japan . |
| 3201259 | 9/1991 | Japan . |
| 424512 | 6/1992 | Japan . |
| 462157 | 10/1992 | Japan . |
| 4353664 | 12/1992 | Japan . |
| 574034 | 3/1993 | Japan . |
| 533361 | 4/1993 | Japan . |
| 2241819 | 9/1991 | United Kingdom . |

*Primary Examiner*—Stuart S. Levy
*Assistant Examiner*—George J. Letscher
*Attorney, Agent, or Firm*—Morrison Law Firm

[57] ABSTRACT

A disk player has a magazine for storing disks and a disk transport mechanism transporting a selected disk between a playback position outside the magazine and a store position located entirely within the magazine. The carriages are stacked upon each other and pivotally supported within the magazine. The carriages are extracted from the stack by lifting a front end of a carriage above a selected carriage. A transport mechanism moves carriages between the magazine, the playback position and an eject position. A disk sensor senses the presence of a disk in the transport mechanism before the carriage is reinstalled in the magazine and a memory updated to indicate that the selected carriage is occupied by a disk. If an extra disk is inadvertently placed on the selected carriage, after the transport mechanism reinstalls the selected carriage, the sensor indicates that a disk remains on the transport mechanism. The transport mechanism then brings the extra disk to the eject position before moving the magazine to prevent the extra disk from being damaged by the movement of the magazine.

6 Claims, 27 Drawing Sheets

DEVICE FOR PLAYING BACK DISKS INCLUDING THE DETECTION OF A MAGAZINE CARRIAGE WHICH IS SIMULTANEOUSLY CARRYING TWO DISKS

BACKGROUND OF THE INVENTION

The present invention relates to a device for playing recorded disks and specifically to such devices possessing the capability of storing multiple such disks in a movable magazine and playing them selectively. In particular, the present invention relates to a device which uses output from a sensor, that detects the presence of disks in a playback position, to prevent disk damage during movement of the magazine.

The present applicant previously proposed a disk playback device in Japanese Laid-Open Publication No. 5-71176. The device has an internal magazine capable of moving up and down. The magazine moves a selected disk, stored within, to and from a load position. The device has a transport mechanism to further move disks between the load position and a playback position. At all times, in this prior art device, each disk is carried on and held by a respective carriage. Great compactness is achieved with the basic layout of this playback device by arranging the magazine so that a disk in the playback position partly overlaps other disks within the magazine.

A problem with this design occurs when disks are stacked on top of each other in a single carriage. When this occurs, the top disk is left behind in the tray because an edge of a mounting opening blocks the upper disk when the carriage is moved from the playback position to the magazine. The disk left behind could then be damaged when the magazine is moved vertically because, as noted, the stored disks overlap the disk in the playback position.

OBJECTS AND SUMMARY OF THE INVENTION

It is an object of the present invention to provide a disk playback mechanism that overcomes the drawbacks of the prior art device.

It is another object of the present invention to provide a disk playback mechanism, with a vertically moving magazine and with a playback mechanism that permits a disk being played back to overlap disks stored in the magazine, which is capable of operating with high reliability.

Briefly stated, there is described, a disk player having a magazine for storing disks and a disk transport mechanism transporting a selected disk between a playback position outside the magazine and a store position located entirely within the magazine. The carriages are stacked upon each other and pivotally supported within the magazine. The carriages are extracted from the stack by lifting a front end of a carriage above a selected carriage. A transport mechanism moves carriages between the magazine, the playback position and an eject position. A disk sensor senses the presence of a disk in the transport mechanism before the carriage is reinstalled in the magazine and a memory updated to indicate that the selected carriage is occupied by a disk. If an extra disk is inadvertently placed on the selected carriage, after the transport mechanism reinstalls the selected carriage, the sensor indicates that a disk remains on the transport mechanism. The transport mechanism then brings the extra disk to the eject position before moving the magazine to prevent the extra disk from being damaged by the movement of the magazine.

According to an embodiment of the present invention, there is described, a device for playing back disks comprising: means for storing a plurality of disks, the device having a playback position, means for reading a selected one of the disks at the playback position, means for transporting the selected between the playback position and a store position in the means for storing, the means for transporting having means for holding at least the selected one, means for detecting a presence of a further disk in addition to the selected disk held by the means for holding and means for displaying an error message responsively to the means for detecting.

According to another embodiment of the present invention, there is described, a device for playing back disks, comprising: means for storing a plurality of disks, the device having a playback position, means for reading a selected one of the disks at the playback position, means for transporting the selected between the playback position and a store position in the means for storing, the means for transporting having means for holding at least the selected one, means for detecting a faulty attempt to transport the selected one from the playback position to the store position and means for displaying an error message responsively to the means for detecting.

According to still another embodiment of the present invention, there is described, a device for playing back disks, comprising: a magazine for storing carriages, each of the carriages having means for carrying at least one of the disks, means for playing a disk carried by a selected carriage of the carriages at one of a first position and a playback position, means for transporting the selected carriage from the magazine to one of the first position and the playback position, means for transporting the selected carriage from the one of the first position and the playback position to an eject position whereat access is provided for loading and unloading disks, means for transporting the selected carriage from the eject position to the one of the first position and the playback position, means for transporting the selected carriage from the one of the first position and the playback position to the magazine, means for detecting another disk in the one of the first position and the playback position after a transporting of the selected carriage to the magazine and means, responsive to the means for detecting, for permitting the another disk to be removed from the device.

According to still another embodiment of the present invention, there is described, a device for playing back disks, comprising: a magazine for storing carriages, each of the carriages having means for carrying at least one of the disks, means for playing a selected disk carried by a selected carriage of the carriages at a playback position, the selected disk at least partly overlapping stored disks carried by carriages stored in the magazine when the selected carriage is in one of a first position and the playback position, means for moving the magazine relative to the one of the first position and the playback position, means for transporting the selected carriage from the magazine to one of the first position and the playback position, means for transporting the selected carriage from the one of the first position and the playback position to an eject position whereat access is provided for loading and unloading disks, means for transporting the selected carriage from the eject position to the one of the first position and the playback position, means for transporting the selected carriage from the one of the first position and the playback position to the magazine, means for detecting another disk in the one of the first position and the playback position after a transporting of the selected carriage to the magazine and means, responsive to the means for detecting, for permitting the another disk to be removed from the device.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
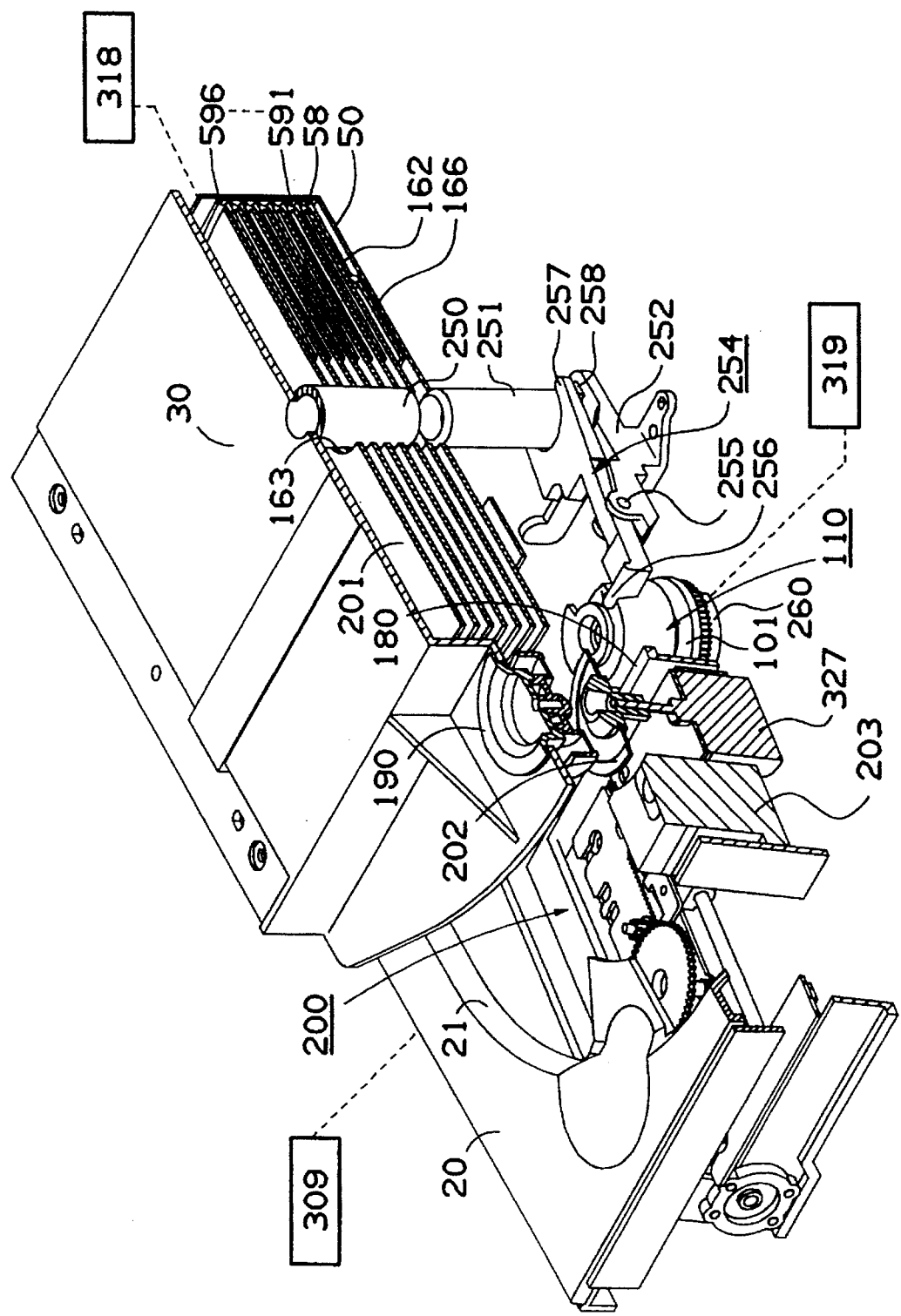
FIG. 1 is a cross-section perspective drawing of the present disk playback device in the store position.

Referring to FIG. 1 a disk playback device, shown generally at 1000, includes a magazine 50 which holds seven carriages 58, 591–596 for carrying disks. The seven carriages 58, 591–596 include an S carriage 58 and first through sixth carriages, 591–596, respectively. S carriage 58 is stored in the lowest level of magazine 50. S carriage 58 differs from first through sixth carriages 591–596 in that S carriage 58 has a 12 cm. diameter disk mounting recess 162 and an 8 cm. diameter mounting recess while the first through sixth carriages, 591–596, have only a 12 cm. disk mounting recess. The 12 cm. disk mounting recess 162, is shown more clearly in FIG. 3. The seven carriages, 58 and 591–596, are stored in the magazine 50 stacked in contact with each other.

Magazine 50 is moved vertically, by a vertical transport mechanism 318, to align a selected one of seven positions, corresponding to the locations of the seven carriages 58, 591–596, with a store position. The store position is a position of a disk, or carriage, in the magazine which is in planar alignment with a playback position above a turntable 202. Once a selected carriage is aligned with the store position, a tray/carriage transport mechanism 309 can transport the selected carriage to the playback position for playing. One position, designated Pos(s), corresponds to the selection of S carriage 58. Another position, designated Pos(1), corresponds to the selection of first carriage 591. Still another position, designated Pos(2), corresponds to the selection of second carriage 592, and so on with Pos(3) through Pos(6) designating the selection of third through sixth carriages 593–596, respectively. Positions Pos(s) and Pos(1)–(6) are defined relative to the magazine 50, while the store and playback positions are defined relative to a chassis of the disk playback device 1000.

Figure 2:
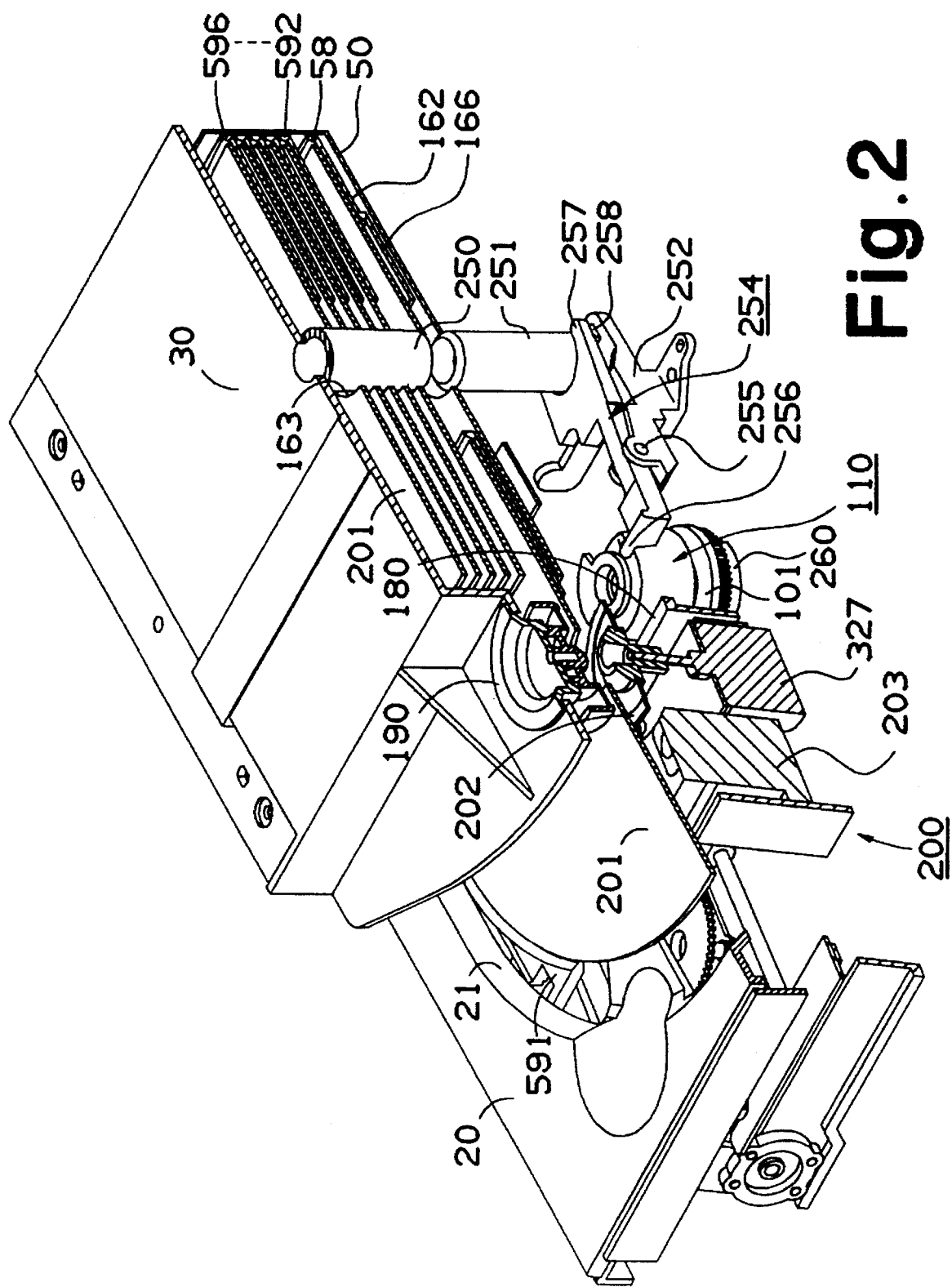
FIG. 2 is a cross-section perspective drawing of the present disk playback device in the playback position.
Figure 3:
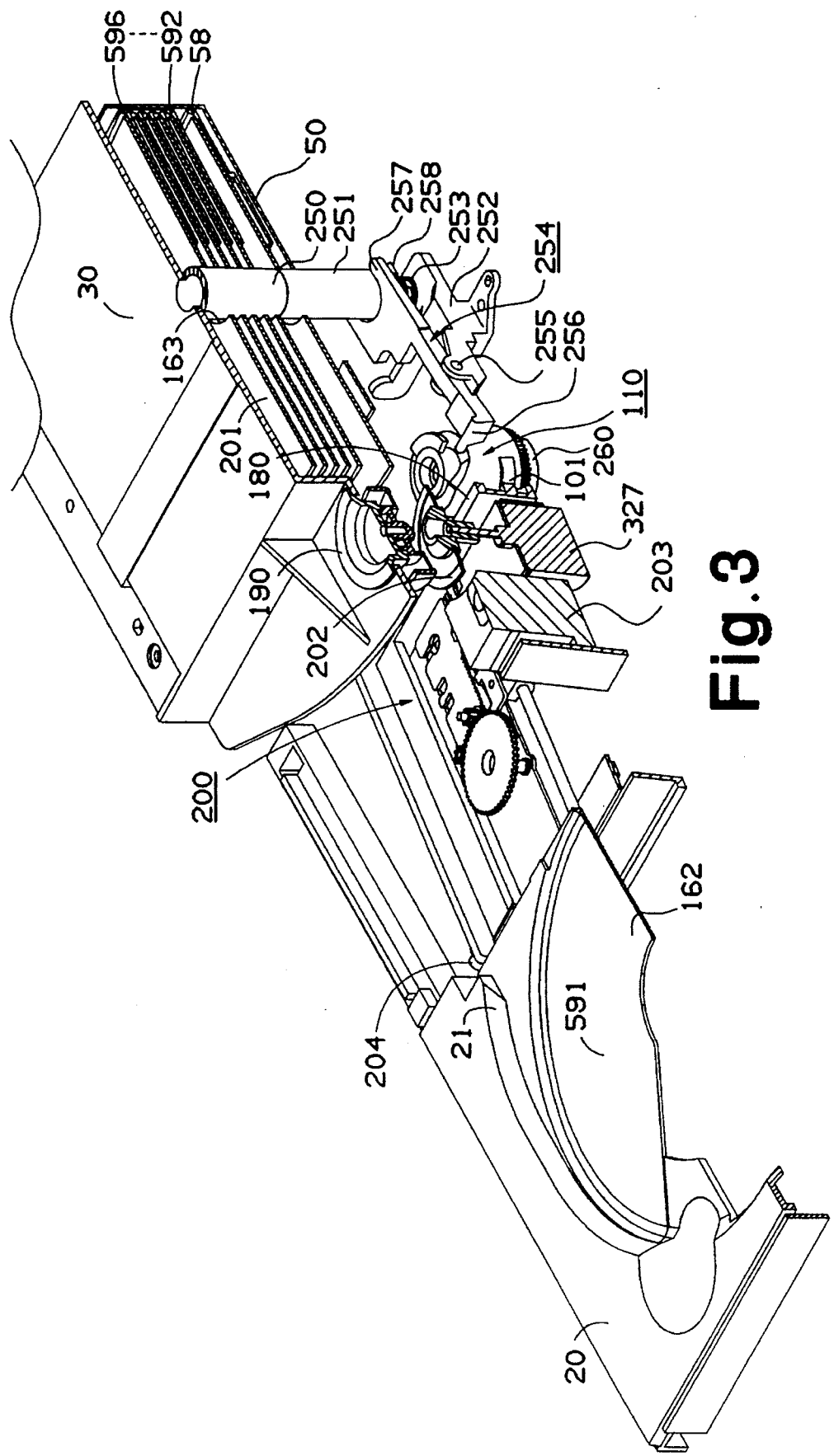
FIG. 3 is a cross-section perspective drawing of the present disk playback device in the eject position.
Figure 4:
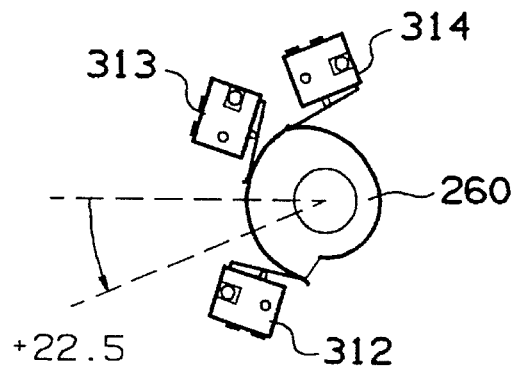
FIG. 4 is a drawing indicating the positional relationship between cam 260 at cam angle +22.5 degrees and switches 312–314.
Figure 5:
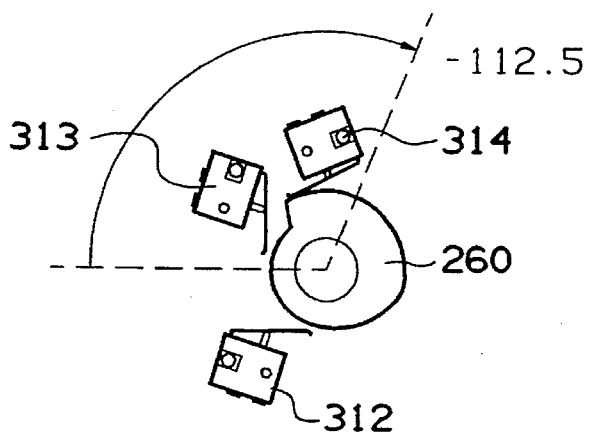
FIG. 5 is a drawing indicating the positional relationship between cam 260 at cam angle –112.5 degrees and switches 312–314.

Referring now also to FIGS. 2 and 3, a selected carriage is transported from magazine 50 to an eject position. Magazine 50 is shown in position Pos(1) where first carriage 591 is the selected carriage. Selected first carriage 591, is moved by tray/carriage transfer mechanism 309, to a playback position as shown in FIG. 2. To play a disk 201, on selected first carriage 591 at the playback position, an optical mechanism 200 rotates upward. Disk 201 is clamped between turntable 202 and a magnetic clamper 190 by the motion of optical mechanism 200 and playback is then performed.

From the playback position, selected first carriage 591 is then moved to a load position (not shown) where selected first carriage 591 is fully inserted in a tray 20. For purposes of this description, first carriage 591 is selected, however, the operations discussed herein apply to any of first through sixth carriages 591–596 and S carriage 58.

As first carriage 591 is moved from the store position to playback position, a carriage lifter (not shown) engages with a wedge-shaped portion at a front edge of second carriage 592. Second carriage 592 is located immediately above and adjacent first carriage 591. Third through sixth carriages are stacked consecutively atop second carriage 592. The carriage lifter thus lifts the front edges of second through sixth carriages 592–596. S carriage 58, adjacent a bottom of selected first carriage 591, has downward pressure applied to it by the carriage lifter to prevent it from being dislodged as first carriage 591 is withdrawn from magazine 50. Selected first carriage 591 is thus permitted to dismount smoothly from between the stack of adjacent carriages within magazine 50. Second carriage 592 is lifted to provide a space between disk 201, on first carriage 591, and an overlapping disk on the second carriage 592 within the magazine, when first carriage 591 is in the playback position. The space allows sufficient clearance for disk 201 to be clamped by magnetic clamper 190. A top panel 30, above magazine 50, movably supports magnetic clamper 190 near a front edge of top panel 30.

Tray 20 is moved by tray/carriage transport mechanism 309 between the load position and the eject position. Tray 20 picks up selected first carriage 591 at the load position and carries it to the eject position. In the eject position, disk 201 can be removed and replaced in selected carriage 591. Tray 20 also returns selected carriage 591 to the load position from which it can be moved to the playback position and then returned to the store position. After selected first carriage 591 is inserted into tray 20, selected first carriage 591 is locked to tray 20 during transport from the load position to the eject position. Selected first carriage 591 is disengaged from tray/carriage transport mechanism 309 when first carriage 591 is locked into tray 20.

An upper disk lock shaft 250 extends from a lower surface of top panel 30 to project through spindle holes 163 in disks 201 stored within magazine 50. S and first through sixth carriages 58, 591–596, include an opening for the passage of disk lock shaft 250. An end of upper disk lock shaft 250 projects to a level of disk spindle hole 163 of second carriage 592, immediately adjacent and above the selected first carriage 591.

A lower disk lock shaft 251, opposing upper disk lock shaft 250, is movably supported upon support base 252 which permits upper disk lock shaft 250 to move vertically. A spring 253, visible only in FIG. 3, within lower disk lock shaft 251, applies an upward bias to lower disk lock shaft 25 1. A control arm 254 is pivotally mounted on support base 252 by a shaft 255. A follower pin 256 extends from an end of control arm 254 to engage a cam groove 101 in an outer surface of a cam member 110 driven by a cam member drive mechanism 319. Cam groove 101 wraps around cam member 110 in a spiral fashion (the majority of which is not visible from the vantage point of FIGS. 1–3). A yoke 257 extending from another end of control arm 254 engages an upper surface of a pin 258 projecting from lower disk lock shaft 251. Control arm 254 is pivoted by rotation of cam member 110 to raise and lower disk lock shaft 251 between a lock position, engaging upper disk lock shaft 250, and an unlock position, retracted below the selected carriage. Thus, lower disk lock shaft 251 alternately passes through, and out of, spindle hole 163 of the disk on the selected first carriage 591 as lower disk lock shaft 251 moves up and down, respectively.

Optical mechanism 200, positioned below tray 20, is pivotally supported by a pin 204 (visible only in FIG. 3). Pin 204 is horizontally mounted permitting optical mechanism 200 to move in a substantially vertical direction. Optical mechanism 20 includes a base frame 180 from which another pin (hidden behind base frame 180) engages cam groove 101. Thus, optical mechanism 200 is moved vertically when cam member 110 rotates. Optical mechanism 200 moves between an up position and a down position. In the up position, optical mechanism 200 moves close to disk 201 in the playback position (Disk 201 is shown in the playback position in FIG. 2). In the down position, optical mechanism 200 is moved away from disk 201 in the playback position. The positioning of optical mechanism 200 in the down position prevents it from obstructing the movement of selected first carriage 591 into and out of tray 20. A cam 260 is integrally formed on a lower portion of cam member 110 for engaging switches that indicate different states of the disk playback device as described below.

Referring now also to FIGS. 4–7a, cam 260 rotates with cam member 110 to sequentially actuates switches 312–314. Switches 312–314 are precisely positioned at separate locations on a lower surface of a main chassis of the disk playback device 1000. Actuations of switches 312–314 generate signals Pos 1–3 (shown in FIG. 7a), respectively. A rotational angle of cam 260 of zero is defined as the angle at which rotation of cam 260 lifts optical mechanism 200 to the up position. Cam groove 101 is spiral so that optical mechanism 200 is advanced when cam member 110 rotates through angles of 0° to −90°. However, there are also non-advancing portions of cam groove 101 where the optical mechanism remains stationary while cam member 101 rotates through angle ranges +22.5° to 0°, and −90° to −202.5°. At angles of rotation of cam 260 above zero, optical mechanism 200 is maintained in the up position. When optical mechanism 200 is in the up position, lower disk lock shaft 251 is in the unlock position and switches 312–314 are all switched on. Thus, signals Pos 1–3 are all at a state identified in FIG. 7 as "L."

When cam 260 rotates in the positive direction beyond the 0° point, 312 remains off and the Pos 1 signal is in a low state (hereinafter "H" and "L" represent high and low signal level states respectively). When cam 260 rotates in the negative direction from the 0° point, the Pos 1 signal changes to "H." As cam 260 rotates in the negative direction from a 0° to −90°, optical mechanism 200 gradually descends from the up position to the down position. Below −90°, optical mechanism 200 remains in the down position. Optical mechanism 200 is lowered as necessary to avoid obstructing the movement of carriages into and out of tray 20.

Figure 6:
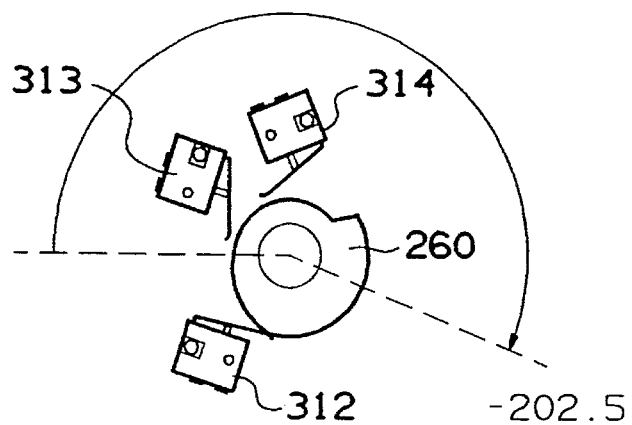
FIG. 6 is a drawing indicating the positional relationship between cam 260 at cam angle –202.5 degrees and switches 312–314.

When cam 260 is at rotational angles above −90°, switch 313 remains off and the Pos 2 signal at "L." While cam 260 is within the range −90° to −135°, optical mechanism 200 stays in the down position and lower disk lock shaft 251 stays in the unlock position. As cam 260 rotates negatively past −135°, switch 314 turns off, changing the Pos 3 signal to "H." During this interval, lower disk lock shaft 251 begins rising, and is brought into the lock position when cam member 110 reaches the −180° position. When cam 260 rotates negatively past the −180° point, switch 312 turns on, as shown in FIG. 6. At the same time, signal Pos 1 changes to "L." While cam 260 is within the range −180° to 202.5° optical mechanism 200 remains in the down position and lower disk lock shaft 251 remains in the lock position.

Figure 7A:
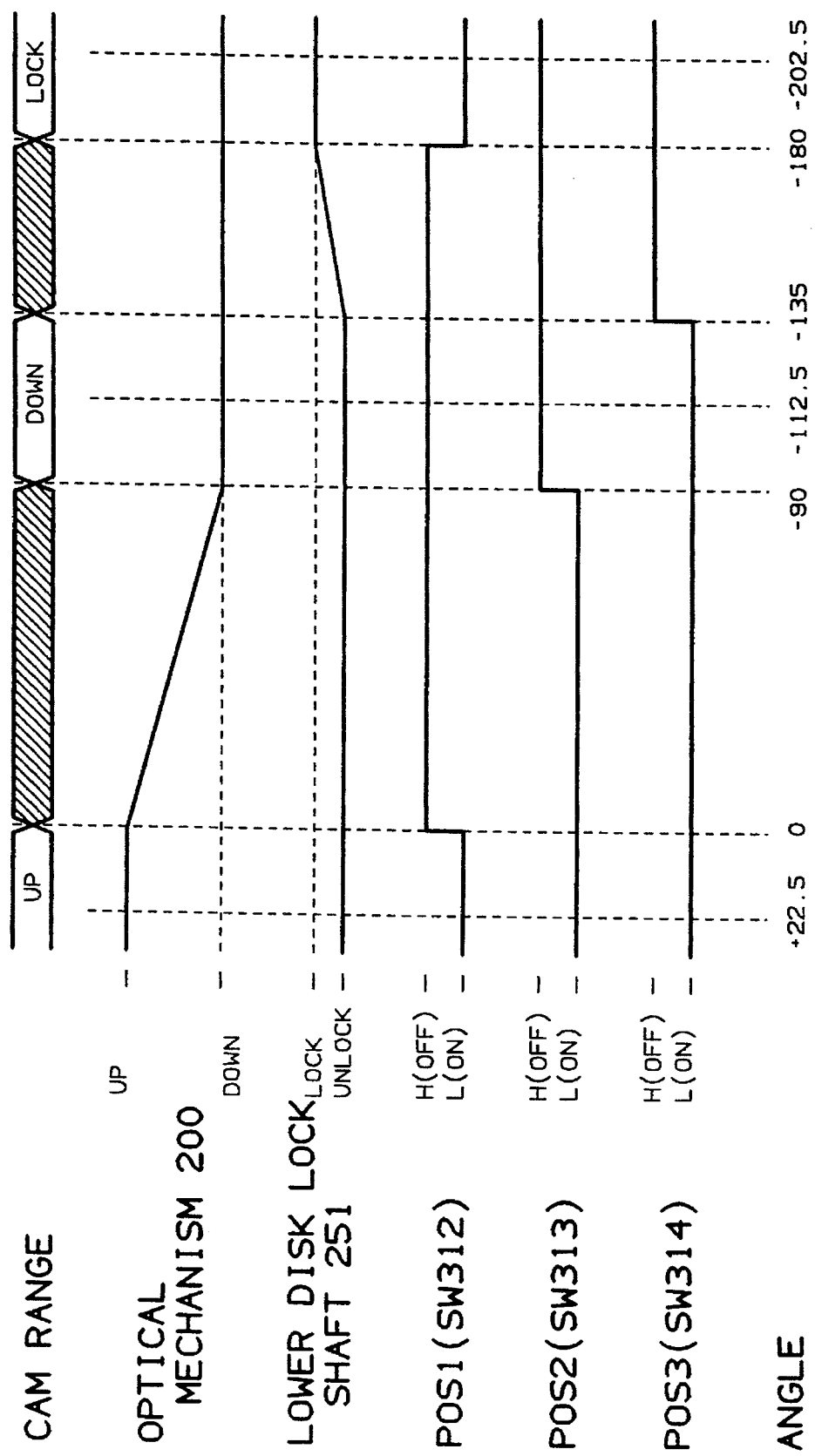
FIGS. 7(a) and 7(b) are timing charts indicating a relationship between optical mechanism 200 and lower disk lock shaft 251 and the cam angle of cam member 110.
Figure 7B:
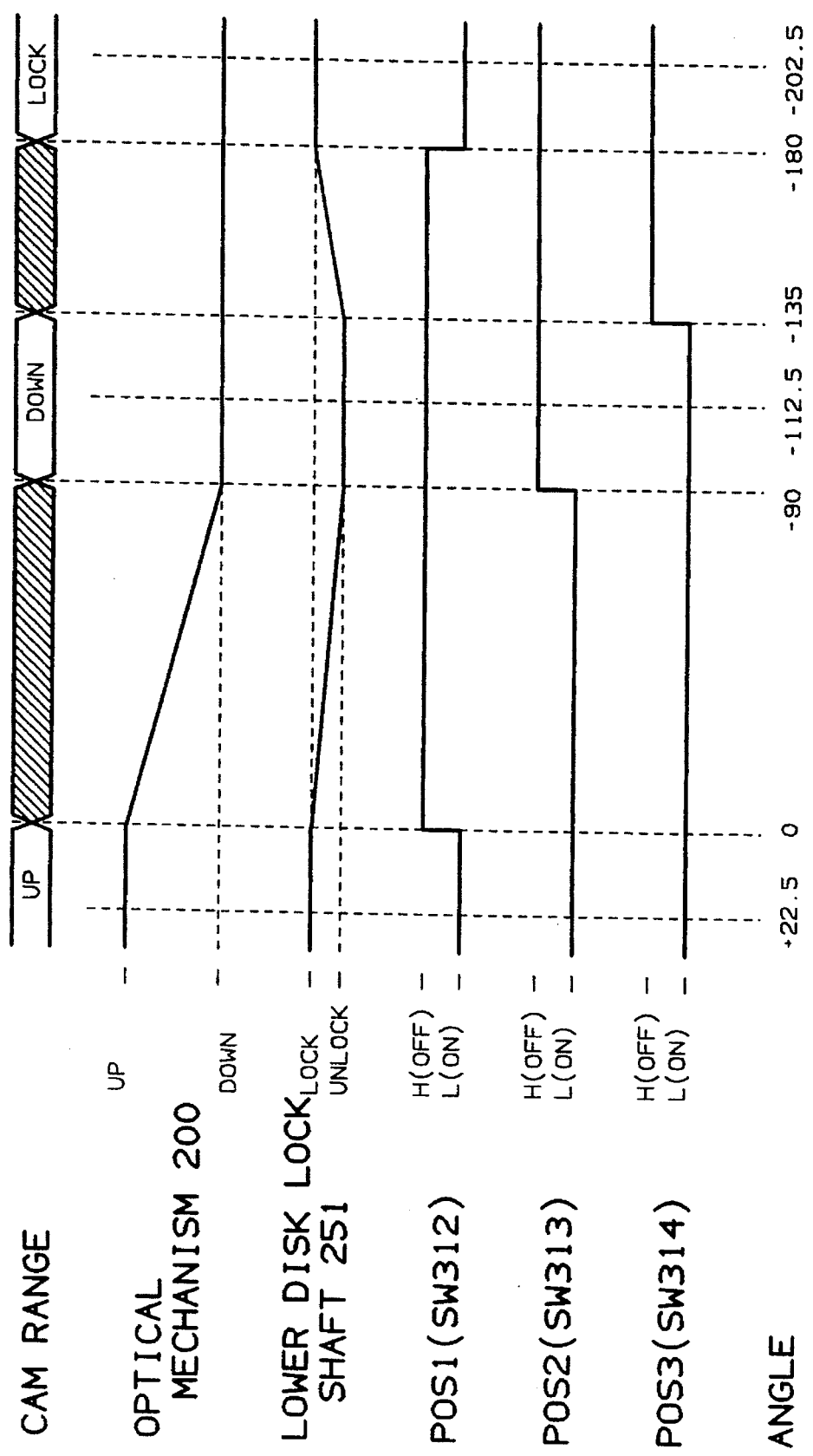

Referring to FIG. 7b, a timing chart, similar to that of FIG. 7a except as noted herein, shows an alternative mode of operation for the disk playback device 1000. An alternative embodiment of cam member 110 has a cam groove altered from that of cam groove 101 described above. In such an embodiment, follower pin 256 and the pin of the base frame 180 need not engage common cam slots. For instance, separate cam slots may be provided for each. The cam member 110 functions as described with respect to FIG. 7a, except in the rotational range of 22.5° to −90°. From −90° to 0° lower disk lock shaft 251 is raised simultaneously with optical mechanism 200 to lock disks in magazine 50. Since optical mechanism 200 is only raised when the selected disk is at the playback position, a path of lower disk lock shaft 251 is clear of the selected disk. Thus, disks are maintained in a secure state during playback operation of disk playback device 1000. Since lower disk lock shaft 251 is placeable in a locked position when optical mechanism 200 is in either an up or down position, disks are also securable in magazine 50 during any mode of operation except during disk transport out of magazine 50 when the selected disk blocks the path of lower disk lock shaft.

Figure 8:
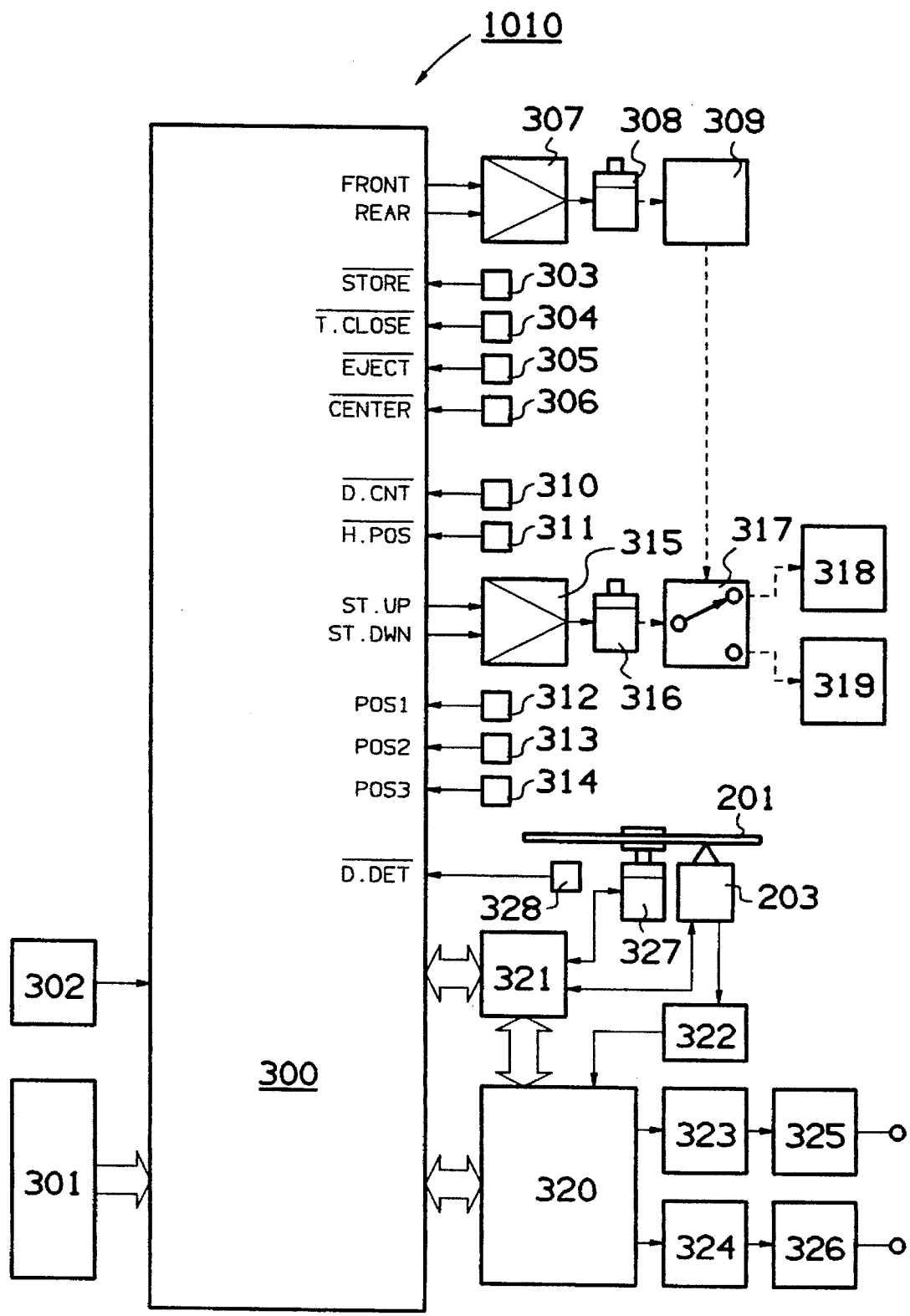
FIG. 8 is a block diagram indicating the control circuit for the present disk playback device.

Referring also to FIG. 8, a control circuit 1010 includes a system controller 300. System controller 300 has a read-only memory, a random-access memory, and interface circuitry. System controller 300 also incorporates one or more microprocessors. System controller 300 controls disk playback device 1000 according to an operating mode set by user input through a mode control panel 301. System controller 300 is connected to a backup power supply 302, which allows its random-access memory to retain the states of flags that indicate the position of magazine 50, the presence of disks in selected positions in magazine 50 and other conditions, when the power supply is turned off.

Limit switches 303–305 apply high "H" and low "L" signal levels to STORE, T.CLOSE, and EJECT inputs of system controller 300, respectively. An "L" signal level at the STORE input indicates the store position of tray/carriage transport mechanism 309 (not shown). An "L" signal level at the T.CLOSE input indicates the load position of tray/carriage transport mechanism 309. An "L" signal level at the EJECT input indicates the eject position of tray/carriage transport mechanism 309. A photo-interrupter 306 detects and indicates the playback position of tray/carriage transport mechanism 309 by applying a signal at a CENTER input of system controller 300.

System controller 300 applies control signals to a motor drive circuit 307 via a FRONT output and a REAR output. Tray motor 308, rotates in forward and reverse directions according to output from motor drive circuit 307. Tray motor 308 drives tray/carriage transport mechanism 309. According to an embodiment of the invention, tray 20 (or carriage) moves to the front (toward the eject position) of disk playback device 1000 when an "H" signal level is applied by the FRONT output. Tray 20 moves to the rear (toward a close position of tray 20) of disk playback device 1000 when an "H" signal level is applied by the REAR output. If the "H" level is applied by both FRONT and REAR outputs, the outputs of motor drive circuit 307 are shorted, causing a magnetic braking effect in tray motor 308. When both outputs are held at the "L" level, the outputs of motor drive circuit 307 are open.

To control the position of magazine 50, system controller 300 applies a signal level to an ST.UP output and an ST.DWN output. The ST.UP and ST.DWN outputs are connected to a motor drive circuit 315. Motor drive circuit 315 controls a magazine motor 316. Magazine 50 is driven upward when the "H" level is applied to the ST.UP output and down when the "H" level is applied to the ST.DWN output. When both outputs are held at the "H" level, motor drive circuit 315 outputs are shorted and a magnetic braking action is generated within magazine motor 316. When both outputs are held at the "L" level, motor drive circuit 315 outputs are disconnected releasing the magnetic braking action.

Figure 9:
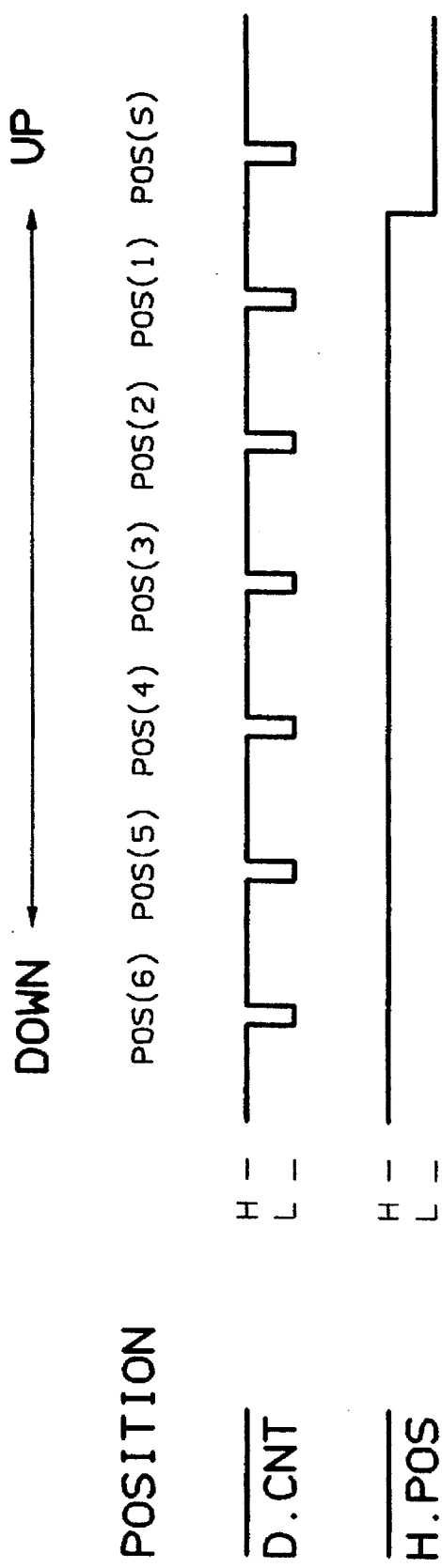
FIG. 9 is a timing chart indicating changes in a D.CNT signal and the H.POS signal relative to the position of magazine 50.

Referring now also to FIG. 9, system controller 300 has several inputs for receiving input signals. A D.CNT input, connected to photo-interrupter 310, receives an input signal that indicates the positions of magazine 50. An H.POS input, connected to limit switch 311, receives an input signal that detects a reference position of magazine 50. FIG. 9 shows the changes in D.CNT signal and H.POS signal corresponding to the position of magazine 50. The D.CNT signal outputs "L" for a short interval each time magazine 50 passes through a position. Inputs Pos 1–Pos 3 are connected to switches 312–313. Inputs Pos 1–Pos 3 receive signals that indicate the position of cam 260, as described above. The H.POS input remains at "L" while magazine 50 is between Pos S and Pos 1 during an upward movement of magazine 50. Thus, when both the H.POS and D.CNT inputs are receiving an "L" level signal, it indicates to system controller 300 that magazine 50 is at position S. The other positions are detected by counting the D.CNT signal as magazine 50 moves in a given direction.

Magazine motor 316 rotates in forward and reverse directions in response to the output from motor drive circuit 315. The rotary output of magazine motor 316 is transmitted via a selection mechanism 317, to either magazine vertical transport mechanism 318 or cam member drive mechanism 319. Selection mechanism 317 is controlled by tray/carriage transport mechanism 309 in response to the position of selected first carriage 591. When selected first carriage 591 is in the store position, magazine vertical transport mechanism 318 is selected. Thus, when carriage 50 is in the store position, magazine 50 moves upward when the ST.UP signal is "H" and moves down when the ST.DOWN signal is "H." When both signals are "H," motor drive circuit 315 outputs are shorted and a magnetic brake is applied to magazine motor 316. When both signals are "L," motor drive circuit 315 outputs are opened releasing the magnetic braking action.

Selection mechanism 317 transfers rotary input to cam member drive mechanism 319 when selected first carriage 591 is in a position other than the store position. For example, selection mechanism 317 drives cam member drive mechanism 319 when selected first carriage 591 is in the playback position. Thus, when selected first carriage 591 is in the playback position, optical mechanism 200 moves downward (lock direction) when the ST.UP signal is "H," and upward (unlock direction) when the ST.DWN signal is "H."

System controller 300 also has a D.DET input to which signals are applied by a disk sensor 310. When disk 201 is present in the selected carriage in the playback position, disk sensor 310 applies an "L" level to the D.DET input.

An optical head 203, is movably connected to optical mechanism 200. Optical head 203 uses a laser to read recorded information from disk 201 generating a playback signal responsively to information recorded on disk 201. System controller 300 is connected to signal processor circuit 320 and a servo signal processor circuit 321. The playback signal is applied to signal processor circuit 320 via an RF amplifier 322. Signal processor circuit 320 generates Lch and Rch audio data after EFM demodulation, de-interleaving and error correction are performed on the raw signal. The audio data are sent to digital-to-analog converters 323, 324 respectively for digital-to-analog conversion. The analog output signals are applied to respective low pass filters 325, 326. Servo signal processor circuit 321 controls a focus servo, a tracking servo and a feed servo on optical head 203. Servo signal processor circuit 321 also controls a CLV servo of a spindle motor 327.

Figure 10:
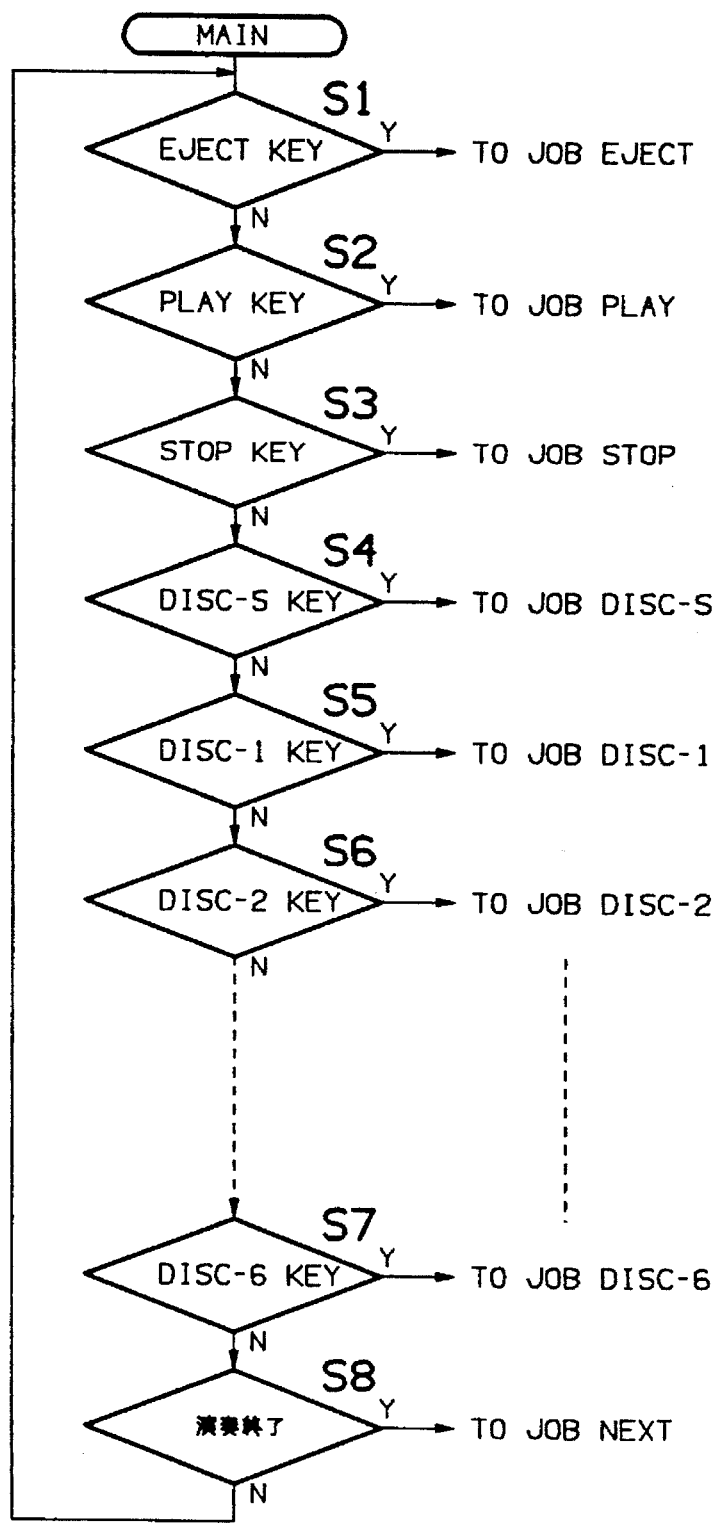
FIG. 10 is a flowchart showing the MAIN routine for system controller 300.
Figure 11:
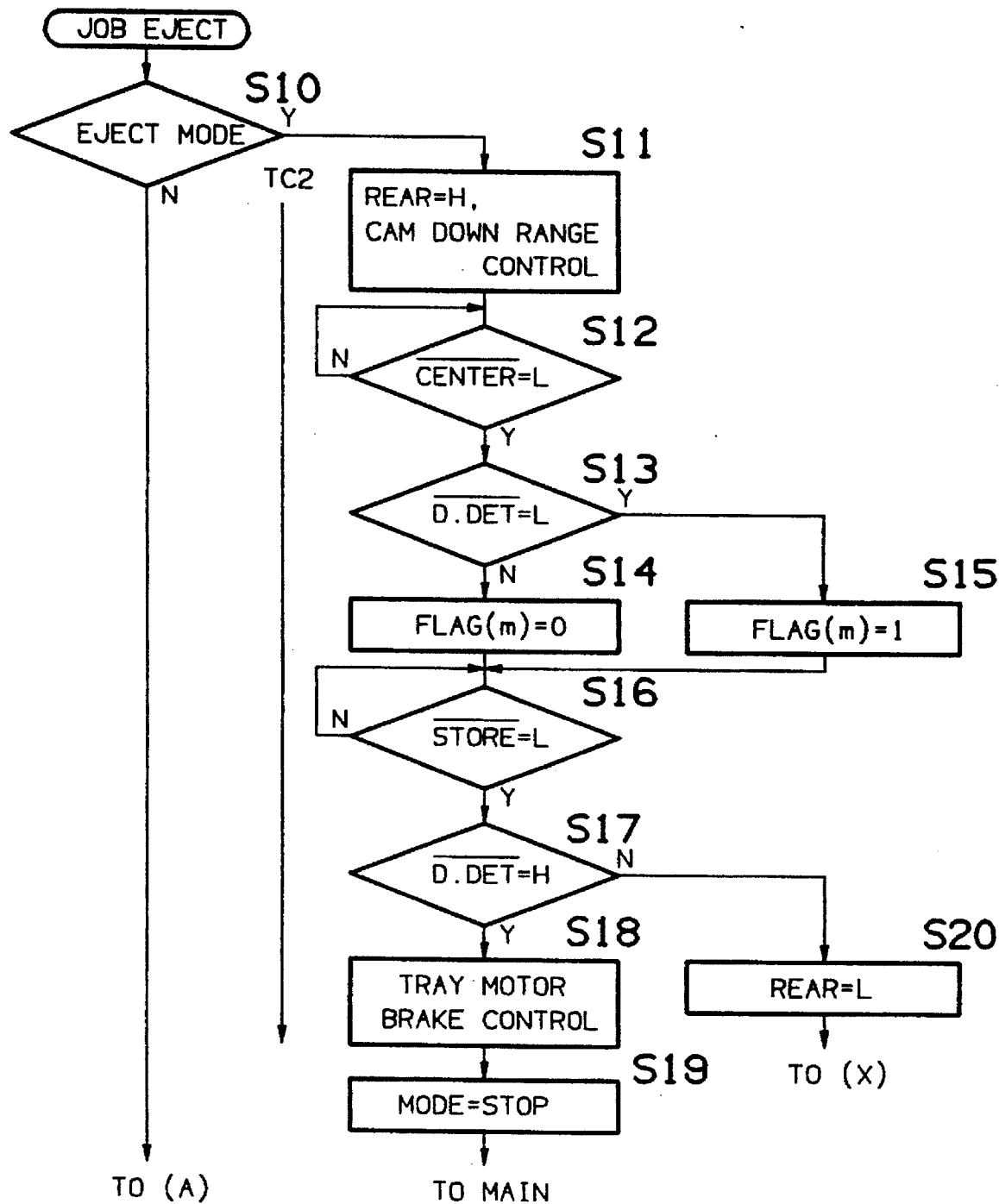
FIG. 11 is a flowchart showing the JOB EJECT routine.

Referring now to FIGS. 1, 2, 3, 7, 10, 11 and 21, when an eject key of mode control panel 301 is pressed while tray 20 is in the eject position, control by system controller 300 passes from step S1 of FIG. 10 to step S11 of FIG. 11. Step S10 is the first step in a JOB EJECT routine, shown in FIG. 11. In step S11, system controller 300 applies the "H" level to the REAR output and cam member 110 begins rotating toward the down range shown in FIG. 7.

Figure 21:
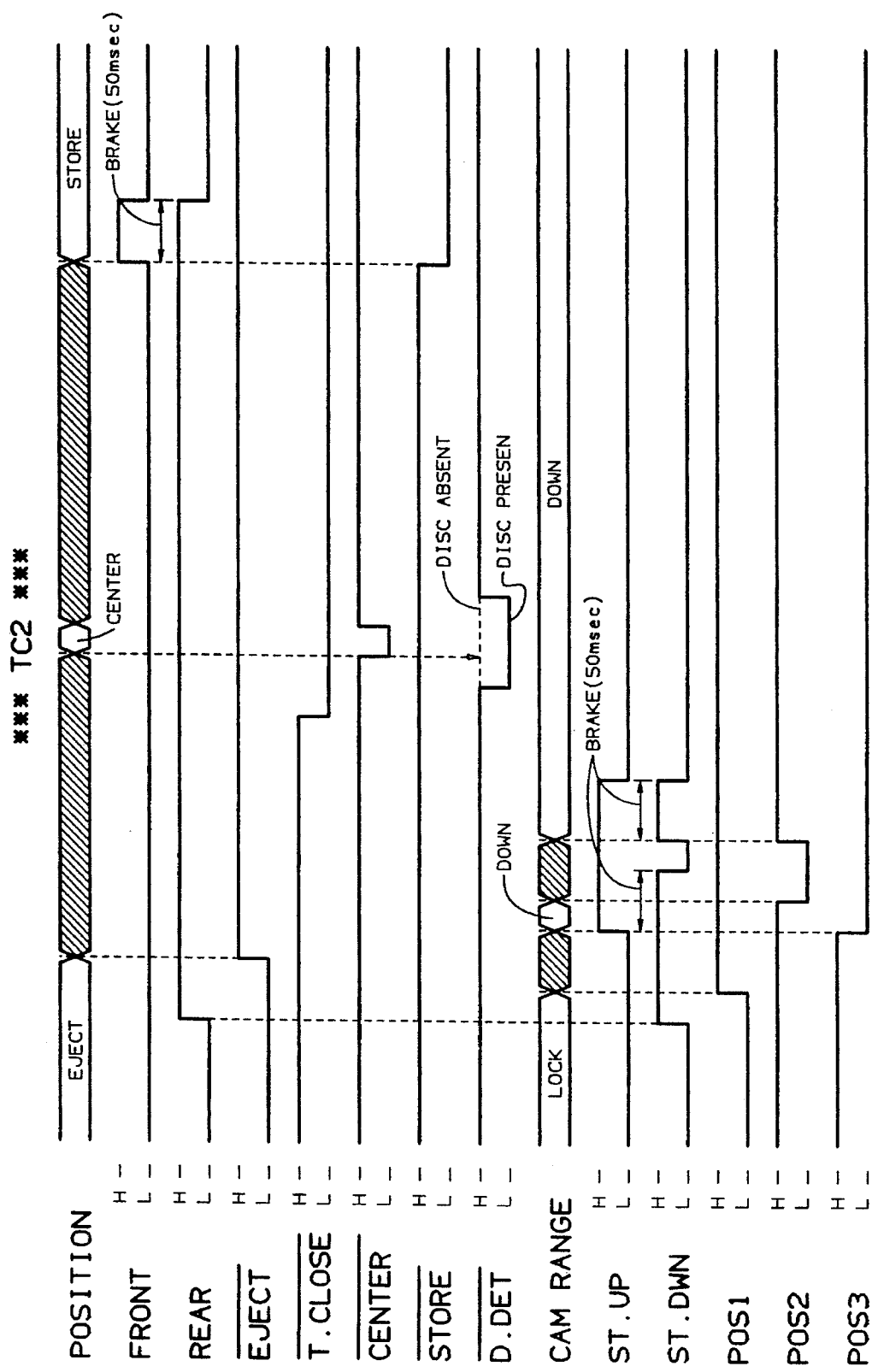
FIG. 21 is a timing chart used in describing the flowchart in FIG. 11.

The JOB EJECT routine proceeds as indicated in the timing chart of FIG. 21. System controller 300 applies the "H" level to the REAR output to begin moving tray 20 toward its close position. At the same time, cam member 110 is rotated in the positive direction when system controller 300 applies the "H" level to the ST.DWN output. This also moves lower disk lock shaft 251 downward from the lock position (indicated in FIG. 3). When lower disk lock shaft 251 arrives at the unlock position and the Pos 3 signal is set to "L" as a result of the rotation of cam 260, system controller 300 applies the "H" level to the ST.UP output shorting motor drive circuit 315 for 50 msec. The shorting of motor drive circuit 315 magnetically brakes magazine motor 316. If cam member 110 over-rotates beyond the down range, system controller 300 applies the "L" level to the ST.DWN output and drives cam member 110 in reverse. When the Pos 2 signal changes to "L," system controller 300 sets the ST.DWN signal to "H" magnetically braking magazine motor 316 for 50 msec. to stop it.

At step S12, system controller 300 waits for the CENTER input signal to change to "L," in response to photo-interrupter 306. The change in the signal applied to the CENTER input indicates arrival of the selected carriage at the playback position. After the first application of the brake is completed, system controller 300 immediately proceeds to step S12, unless cam member 110 over-rotates past the down range. Once tray 20 is in the load position and selected first carriage 591 is pulled out from tray 20 to the playback position, the "L" level is applied to the CENTER output by switch 313. When the CENTER output signal changes to "L," control passes to step S13 where system controller 300 determines if disk 201 is present in selected first carriage 591. The presence or non-presence of disk 201 in selected first carriage 591 is indicated by the signal applied to the D.DET input. If the D.DET signal is "L," it indicates a disk is present. If a disk is present, system controller 300 sets a corresponding flag, FLAG(m), to "1" at step S15. Setting FLAG(m) to "1" indicates the presence of a disk on the $m^{th}$ storage position of magazine 50, where m is an index indicating the storage position number. If the D.DET signal is "H," indicating the absence of disk 201, FLAG(m) is set to "0" at step S14. System controller 300 determines the value of m from the magazine position, which value is stored in memory. After setting FLAG(m), system controller 300 waits for the STORE signal to change to "L" at step S16.

If two disks 201 are set in selected first carriage 591, the top disk 201 may be left in tray 20 when selected first carriage 591 moves from the playback position to the store position. This is because a disk removal opening 21, shown in FIG. 3, is too small to admit two disks on top of each other. An extra disk, left behind in tray 20, could be damaged when magazine 50 moves. To check if an extra disk was carried on selected first carriage 591, when selected first carriage 591 is moved to the store position, where the STORE signal is set to "L," system controller 300 checks the D.DET signal again at step S17.

Figure 12:
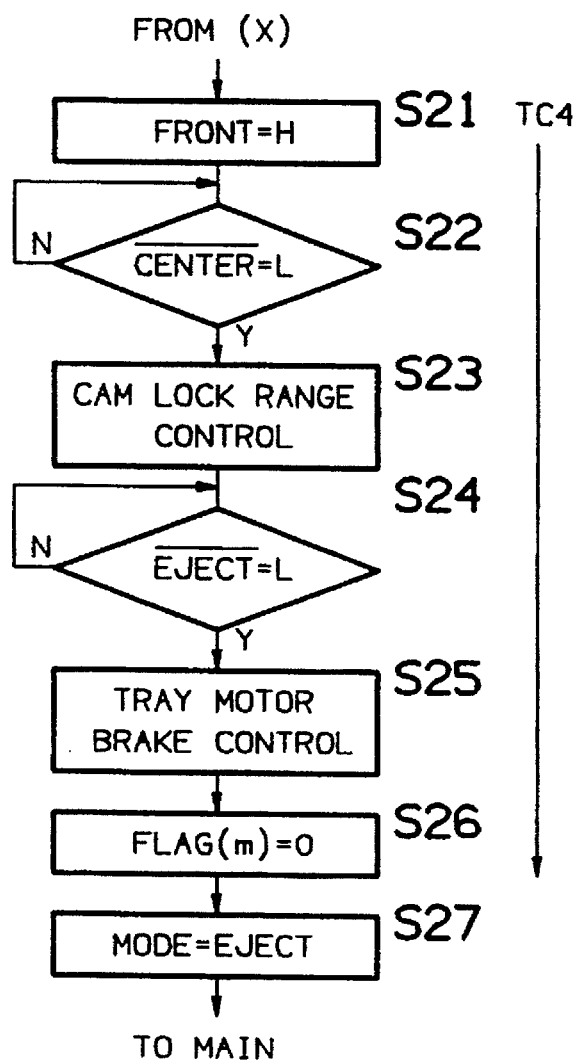
FIG. 12 is a flowchart showing the JOB EJECT routine.
Figure 20:
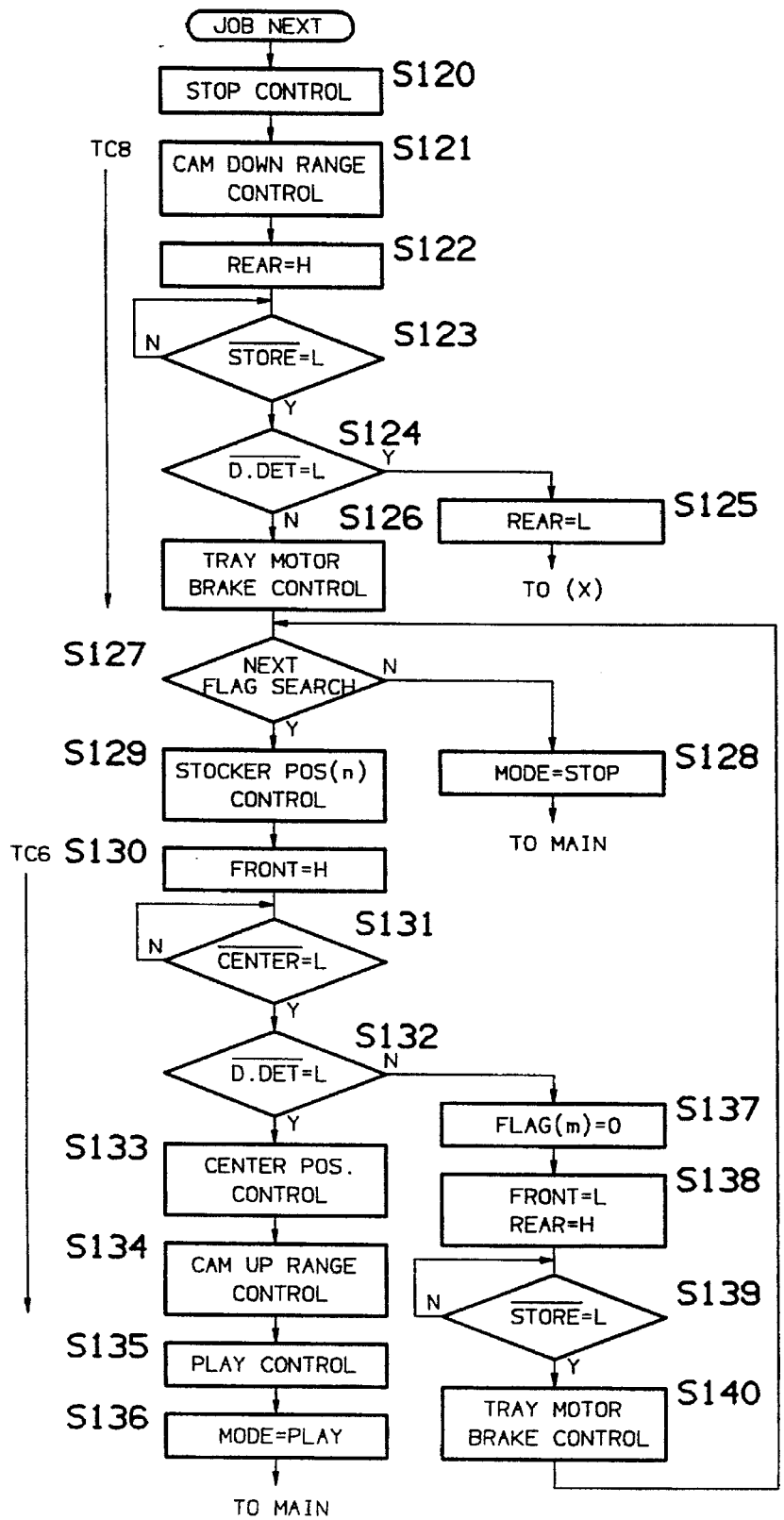
FIG. 20 is a flowchart showing the JOB NEXT routine.

Referring now also to FIG. 12, if, at step S17, the D.DET signal is "H," indicating that there is no disk present in selected first carriage 591, control passes to step S18. At step S18 system controller 300 sets a FRONT output signal to "H" and shorts the input leads to tray motor 308 for 50 msec., braking magazine motor 316. Then, at step S19, a MODE variable is set to indicate a "STOP" mode and control returns to the MAIN routine of FIG. 10. If D.DET signal is "L" at step S17, indicating the presence of a disk, system controller 300 sets the REAR signal to "L" at step S20 and control passes to step S21 of FIG. 12. In the routine of FIG. 20, selected first carriage 591 is reinserted into tray 20 and brought to the eject position. When tray 20 with selected first carriage 591 is returned to the eject position, the extra disk and the original disk 201 are carried with it. Note that, at step S17, the extra disk, which remains behind because of the limited size of the opening providing access to the store position, continues to rest partially on top of selected first disk 591 when selected first carriage is shifted to the store position. When, at step S20, selected first carriage 591 is brought back into tray 20, selected first carriage 591 and the bottom disk 201 slide back underneath lagging extra disk without jamming.

Figure 22:
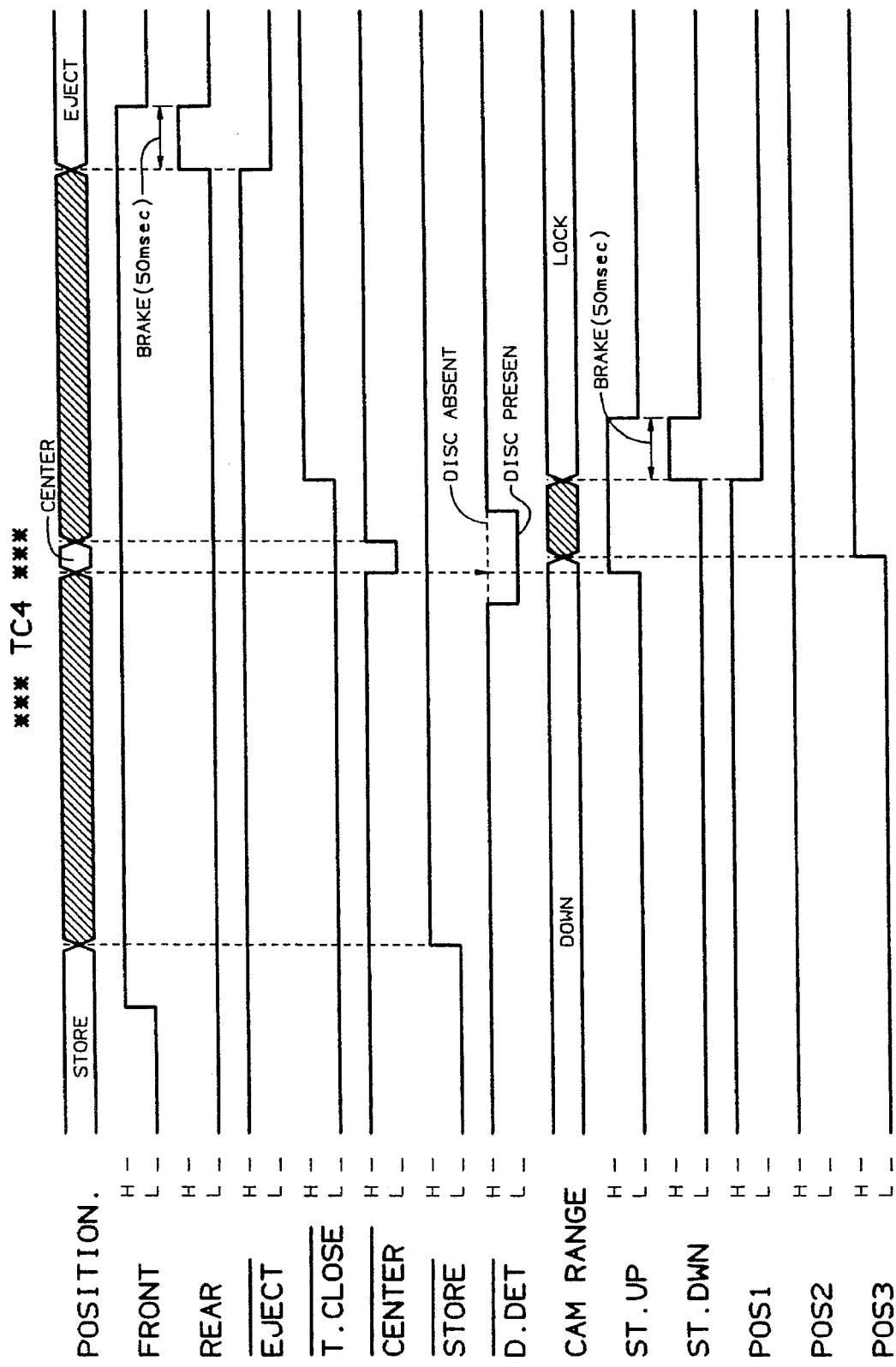
FIG. 22 is a timing chart used in describing the flowchart in FIG. 12.

Referring now also to FIG. 22, at step S21, system controller 300 sets the FRONT signal to "H," moves selected first carriage 591 toward the playback position and waits for the CENTER input signal to change to "L" indicating arrival of selected first carriage 591 at the playback position. Once selected first carriage 591 has moved to the playback position and the CENTER input signal has changed to "L," system controller 300 moves lower disk lock shaft 251 to the LOCK position at step S23. System controller 300 sets the ST.UP signal to "H," rotates cam member 110 in the negative direction and moves lower disk lock shaft 251 toward the lock position. Once lower disk lock shaft 251 has moved to the lock position and the Pos 1 signal is "L," the ST.DWN output signal is set to "H" and magazine motor 316 is magnetically braked for 50 msec. Then, at step S24, system controller 300 waits for the EJECT signal to change to "L."

Once tray 20 is brought to the eject position, indicated by the EJECT signal changing to "L," system controller 300 applies the "H" level to the REAR output and magnetically brakes tray motor 308 for 50 msec. Then, at step S26, system controller 300 resets FLAG(m) to "0." At step S27, the MODE variable is set to indicate an "EJECT" mode and control is returned to the MAIN routine.

According to the above description, at step S17, system controller 300 checks for the presence of a disk in the tray after selected first carriage 591 has substantially arrived at the store position. It is noted that in an alternative embodiment, system controller 300 checks for the presence of an extra disk while selected first carriage 591 is still being transported toward the store position. Thus, system controller 300 would bring selected first carriage, and disk 201 carried in it, back to tray 20 after selected first carriage 591 was only partly shifted, from tray 20, toward the store position, as soon as a lagging extra disk was detected. After selected first carriage 591 was returned to tray 20, tray 20 with both disks would be brought back to the eject position.

According to the routine described above, as system controller 300 brings selected first carriage 591 to the store position, it checks to see if a disk 201 is left on tray 20. If a disk 201 is detected, a carriage is inserted into tray 20 and brought to the eject position. Once tray 20 is in the eject position, the user is informed that two disks are present. Also, when tray 20 is in the eject position, lower disk lock shaft 251 remains in the lock position. Thus, lower disk lock shaft 251 engages a spindle hole of the disk 201 in the carriage below and adjacent selected first carriage 591 in magazine 50. This prevents the disk on the carriage below and adjacent selected first carriage 591 in magazine 50 from shifting even if disk playback device 1000 is vibrated or tilted.

Figure 13:
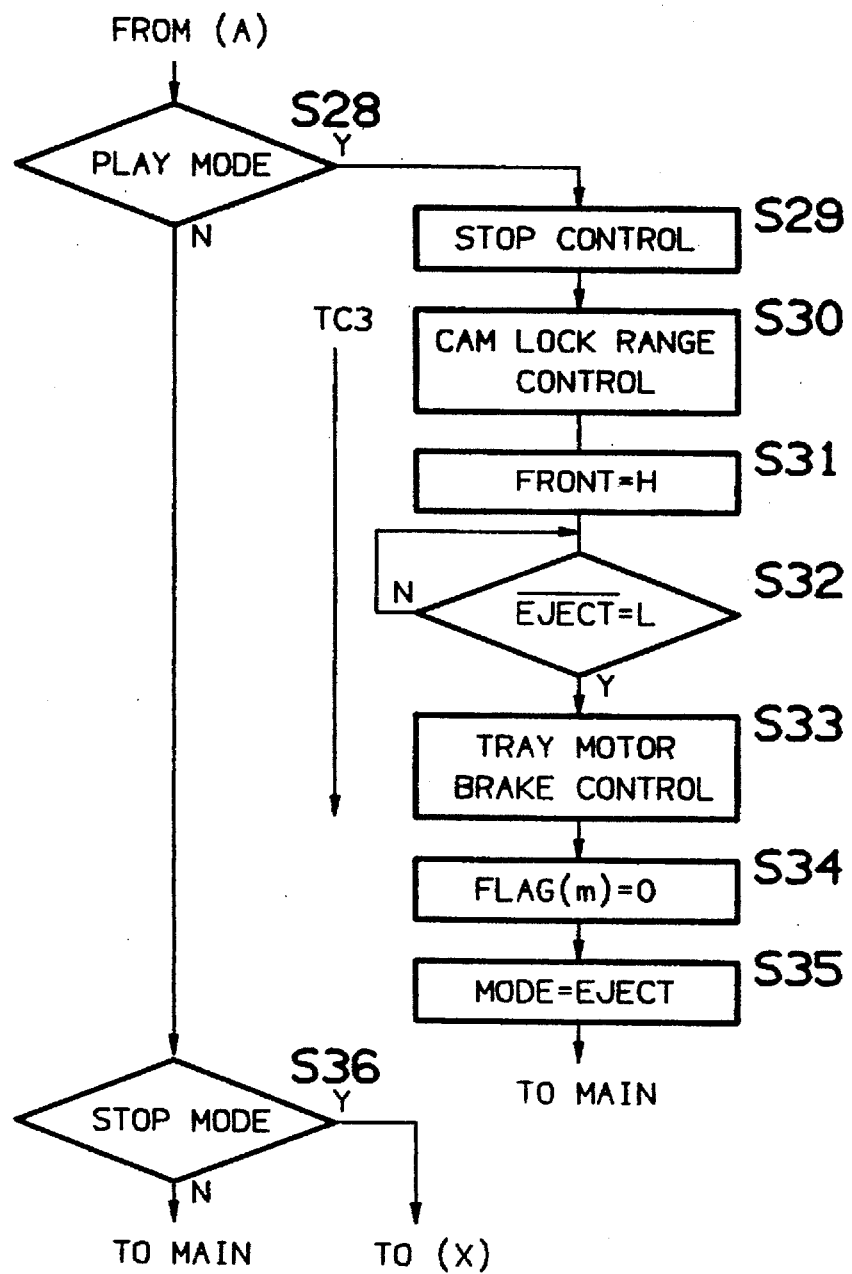
FIG. 13 is a flowchart showing the JOB EJECT routine.

Referring now also to FIG. 13, when the eject key is pressed during a playback mode, system controller 300 proceeds from step S1 of FIG. 10 through step S10 of FIG. 11 to steps S28 and S29 of FIG. 13. At step S30, disk playback is halted and cam member 110 is rotated to a LOCK range shown in FIG. 7.

Figure 23:
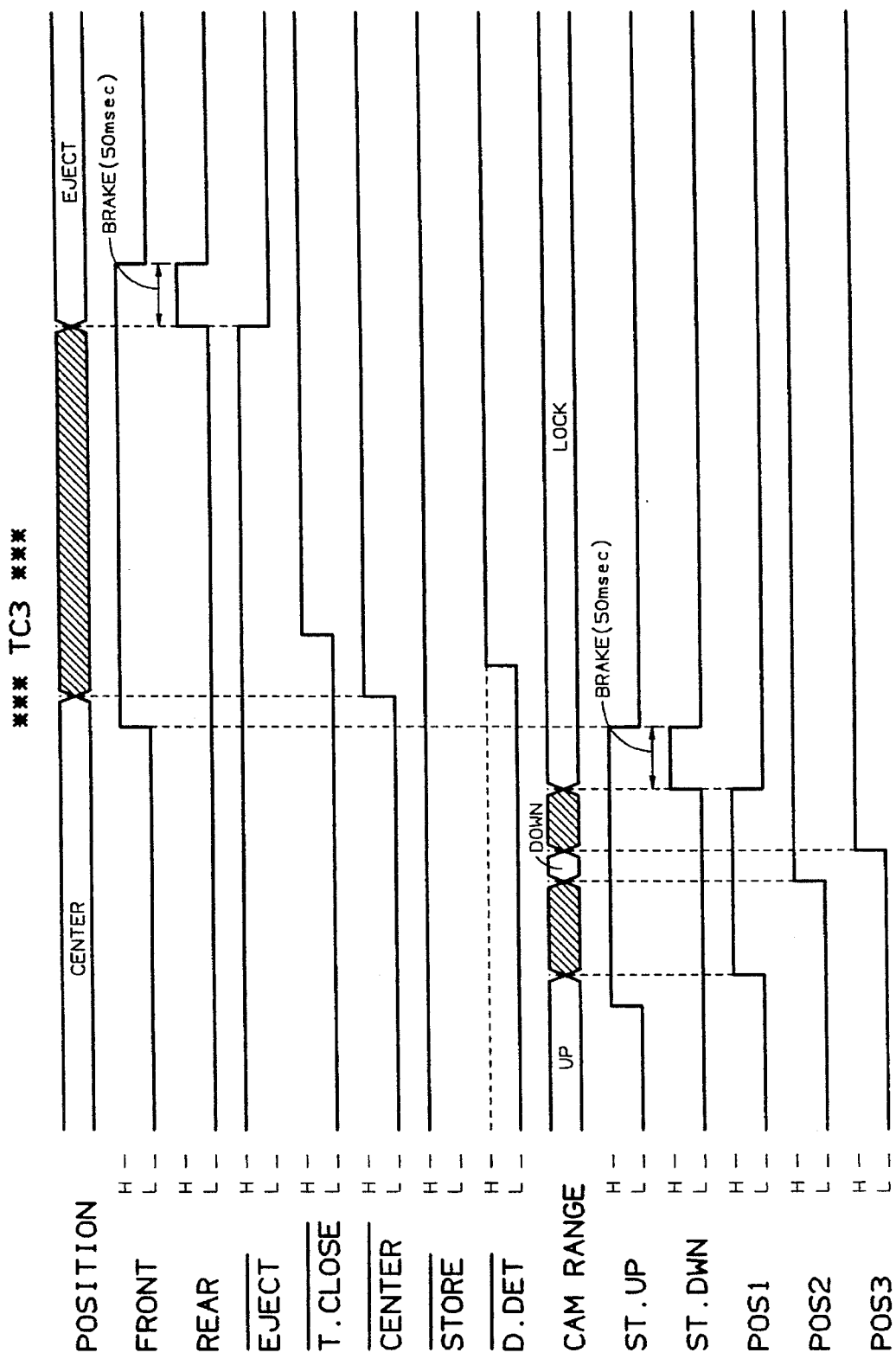
FIG. 23 is a timing chart used in describing the flowchart in FIG. 13.
Figure 24:
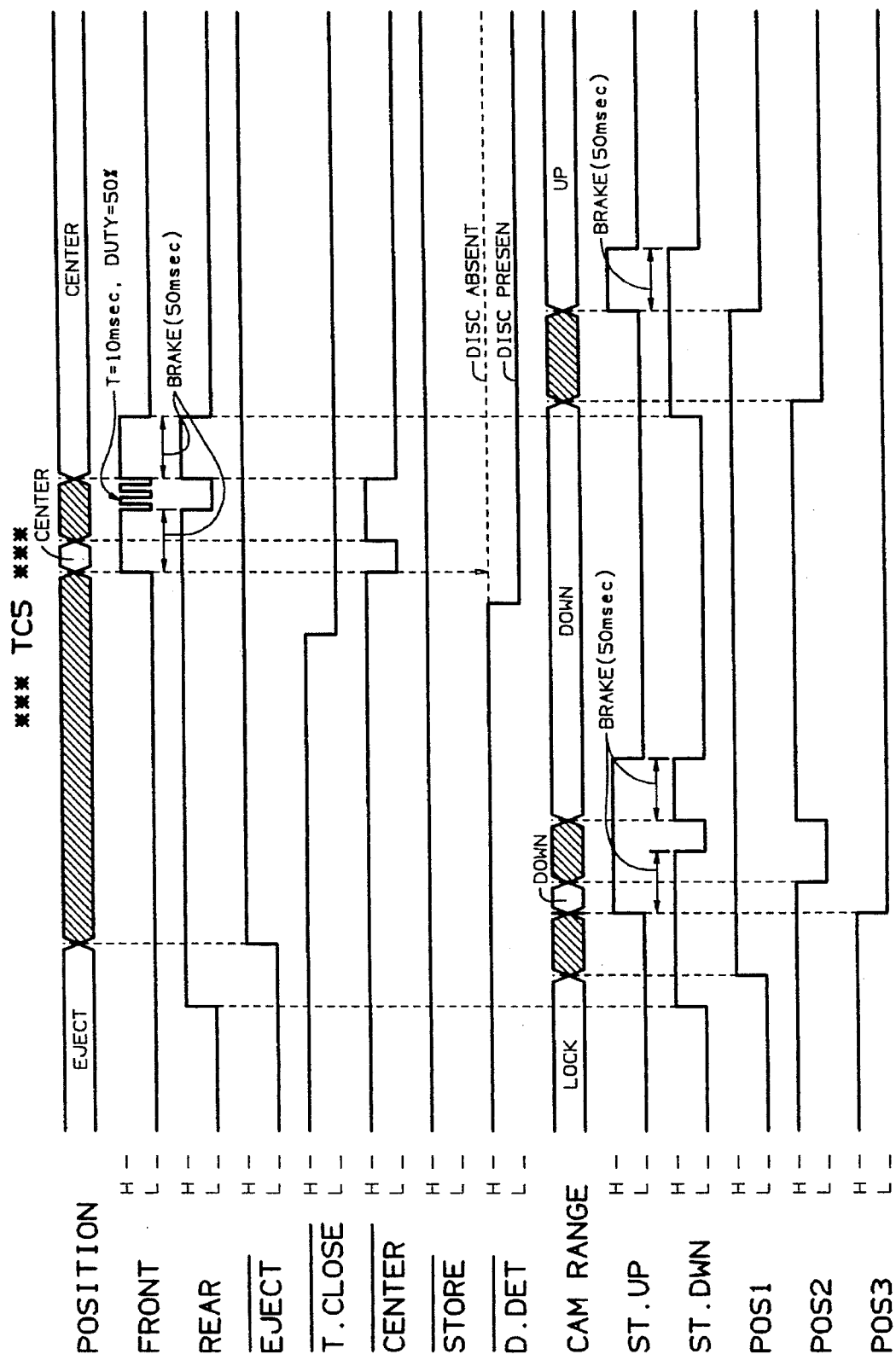
FIG. 24 is a timing chart used in describing the flowchart in FIG. 14.

Referring now also to FIG. 23, system controller 300 applies an "H" level to the ST.UP output. System controller 300 then begins rotating cam member 110 to bring optical mechanism 200 toward the down position. System controller 300 then moves lower disk lock shaft 251 to the lock position. Once lower disk lock shaft 251 arrives at the lock position and the Pos 1 signal becomes "L," due to rotation of cam member 110, "H" is output from the ST.DWN signal line and a magazine motor 316 is magnetically braked for 50 msec. to bring it to a stop. After braking, control proceeds to step S31, where an "H" level signal is applied to the FRONT output. Tray 20 is then moved toward the eject position. At step S32, system controller 300 loops until an "L" signal is received on the EJECT input.

After tray 20 arrives at the eject position, causing the EJECT input signal to change to "L," control proceeds to step S33. At step S33, system controller 300 applies an "H" level at the REAR output and magnetically brakes tray motor 308 for 50 msec. to halt it. At step S34, FLAG(m) is reset to "0." At step S35 the MODE variable is set to indicate the "EJECT" mode and control returns to the MAIN routine of FIG. 10.

When the eject key is pressed during the "STOP" mode (the mode when selected first carriage 591 is in the store position), system controller 300 proceeds from step S1, through steps S10, S28, and S36 to step S21 of the flowchart of FIG. 12. In step S21, selected first carriage 591 is shifted into tray 20 and brought to the eject position. The procedure of FIG. 12 is described above and is not further described here.

Figure 14:
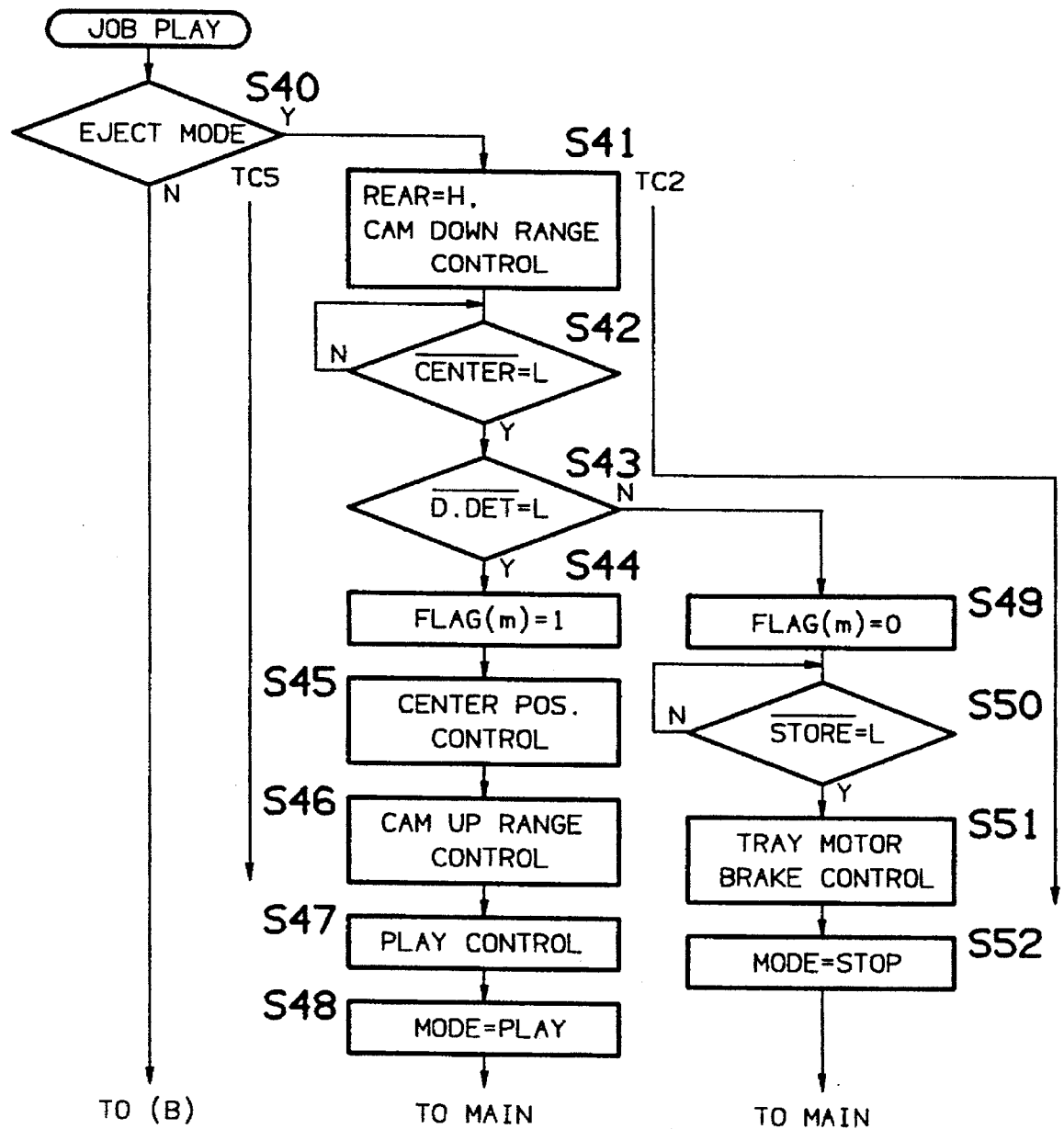
FIG. 14 is a flowchart showing the JOB PLAY routine.
Figure 15:
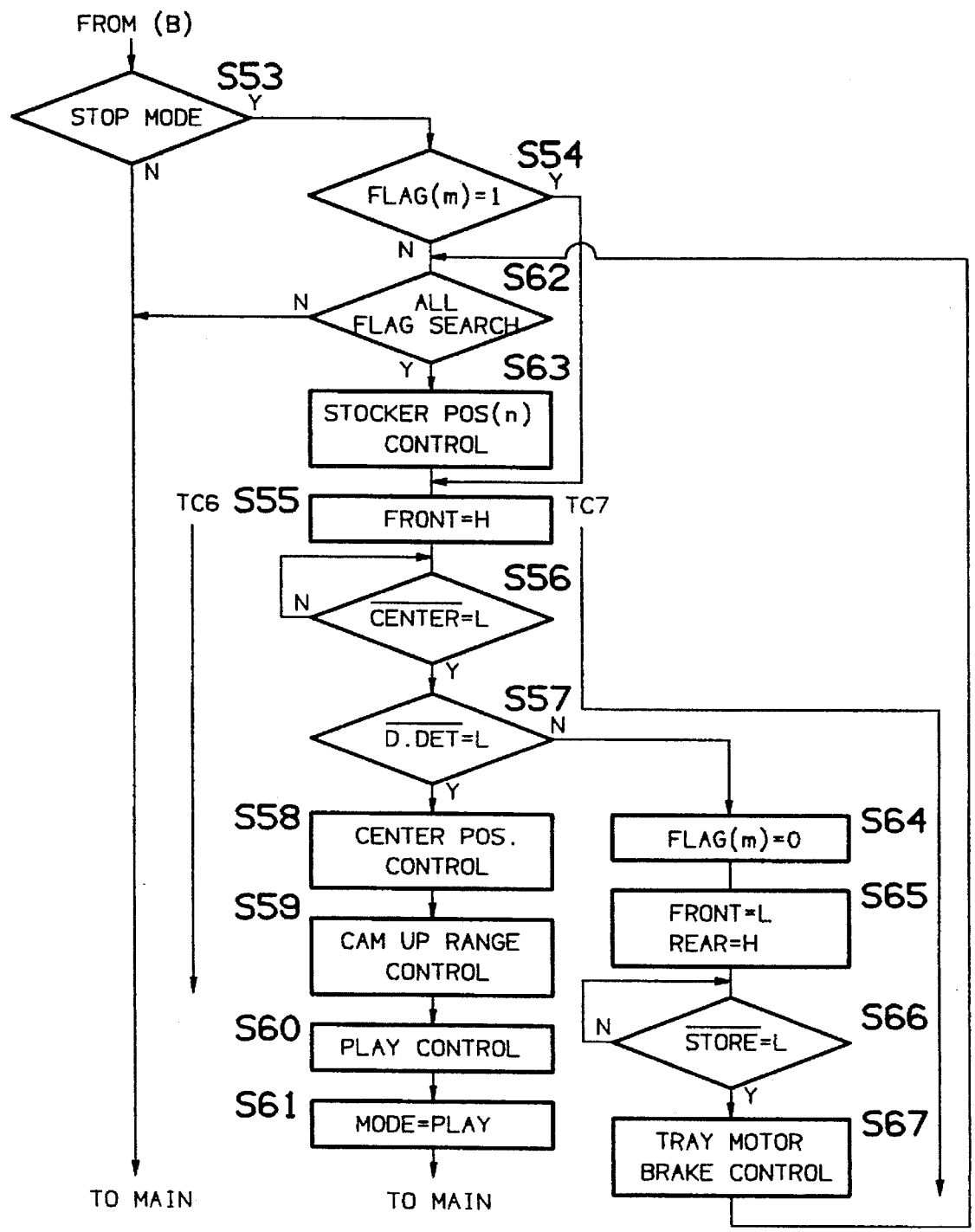
FIG. 15 is a flowchart showing the JOB PLAY routine.

Referring now to FIGS. 10, 14, 15 and 24, when a play key of mode control panel 301 is pressed during the "EJECT" mode, system controller 300 proceeds from step S2 of FIG. 10 to step S40 and step S41 of FIG. 14. At step S41, the REAR output signal is set to "H" bringing cam member 110 toward the down range. System controller 300 sets the REAR output signal to "H," causing tray/carriage transport mechanism 309 to start closing. An "H" level is applied to the ST.DWN output causing cam member 110 to start rotating. Lower disk lock shaft 251 begins moving downward. When lower disk lock shaft 251 arrives at the unlock position indicated by the Pos 3 signal changing to "L," an "H" level is applied to the ST. UP output causing magazine motor 316 to be magnetically braked. If, after the brake is applied, the magazine over-rotates past the down range, system controller 300 applies the "L" signal level at the ST.DWN output to cause cam member 110 to rotate in reverse. When the Pos 2 signal level changes to "H," an "H" level is applied at the ST.DWN output. Magazine motor 316 is magnetically braked for 50 msec. until it stops. At step S42, system controller 300 waits for the CENTER input to change to "L."

At step S43, once selected first carriage 591 has arrived at the playback position and the CENTER input signal changes to "L," the D.DET input indicates whether there is a disk on selected first carriage 591. If the D.DET signal is "L," FLAG(m) is set to "1" at step S44. Tray 20 is then moved precisely to the playback position at step S45. When the CENTER input signal terminal state changes to "L," system controller 300 outputs an "H signal level from the FRONT output braking tray motor 308 for 50 msec. to stop it. After the braking, if tray motor 308 has rotated past the playback position, an "L" level is output from the REAR output and the FRONT output is cycled between "H" and "L" with a 50% duty cycle and a cycle period of 10 msec. Selected first carriage 591 is thus moved in the eject direction at a low speed. Once the CENTER input signal changes to "L," an "H" level is output from both the FRONT and the REAR output terminals braking tray motor 308 for 50 msec. to stop it. Control then proceeds to step S46.

At step S46, system controller 300 brings cam member 110 to the UP range, shown in FIG. 7, as follows. First, an "H" signal level is applied by the ST.DWN output. This causes cam member 110 to begin rotating and optical mechanism 200 to begin moving toward the up position. When optical mechanism 200 arrives at the up position, whereupon the Pos 1 signal changes to "L," an "H" level signal is output from the ST.DWN output for 50 msec., braking magazine motor 316. After the braking, signal processor circuit 320 and servo signal processor 321 are controlled to begin the playback procedure at step S47. Once disk playback has begun, the MODE variable is set to indicate the "PLAY" mode and control returns to the MAIN routine at step S48.

If selected first carriage 591 has no disk 201 in it, control proceeds from step S43 to step S49. In that case, FLAG(m) is set to "0." At step S50, system controller 300 waits for an "L" level signal from the STORE input. Once selected first carriage 591 arrives at the store position and the STORE input signal changes to "L," system controller 300 outputs an "H" level at the FRONT output at step S51. Tray motor 308 is magnetically braked for 50 msec. to stop it. The MODE variable is set to indicate a "STOP" mode and control returns to the MAIN routine at step S52.

Figure 25:
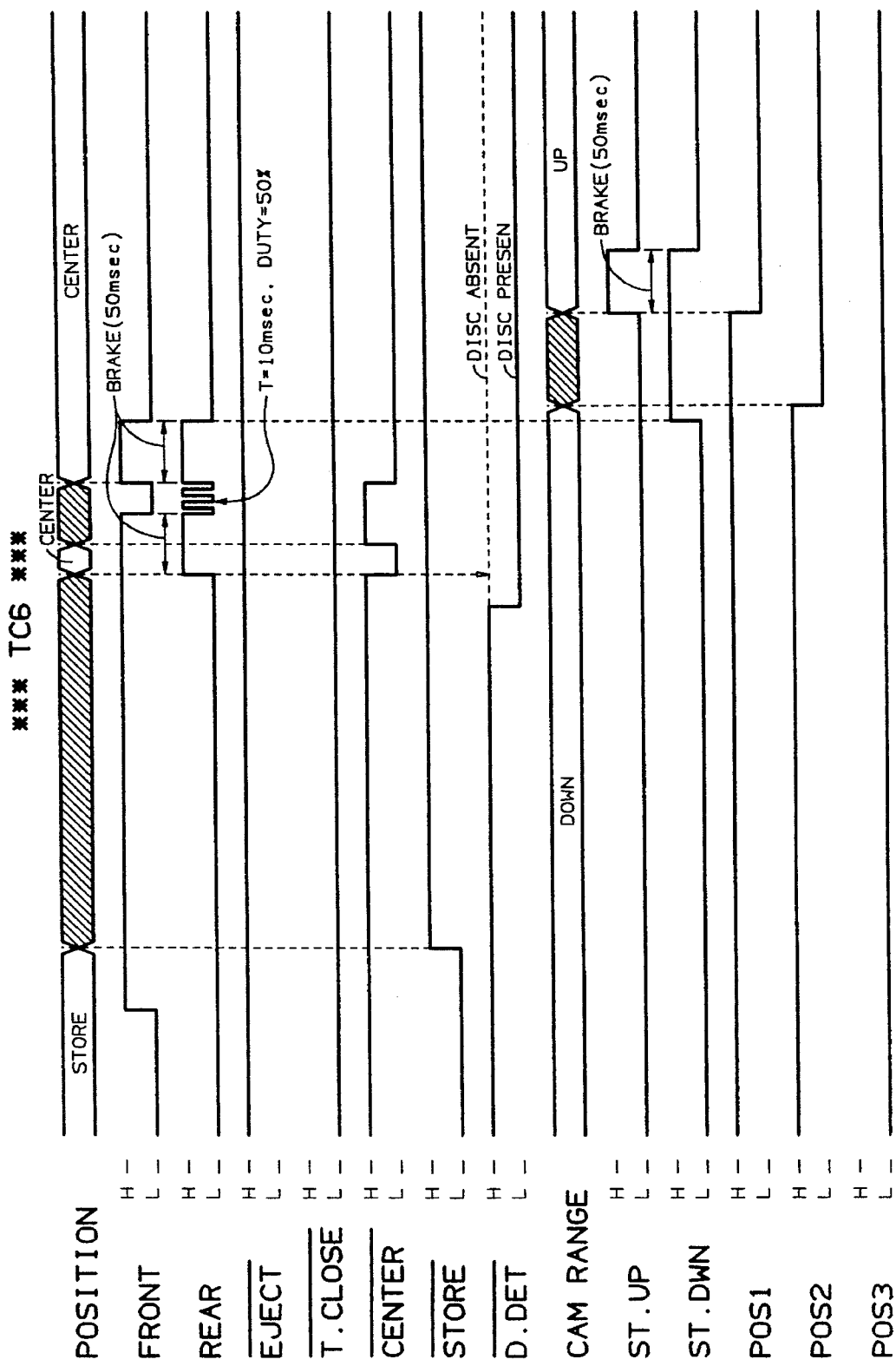
FIG. 25 is a timing chart used in describing the flowchart in FIG. 15.

Referring now also to FIG. 25, if the play key is pressed during the "STOP" mode, system controller 300 proceeds to a JOB PLAY routine, through steps S40 and S53, to step S54. At step S54, control branches to step S55 if FLAG(m) is "1" or to step S62 if FLAG(m) is "0." As stated, when FLAG(m) ="1," there is a disk 201 on selected first carriage 591.

At step S55 system controller 300 outputs an "H" level signal at the FRONT output. Selected first carriage 591 is shifted out of magazine 50. Control then passes to step S56 which loops until the CENTER input signal changes to "L." If FLAG(m) was "0," at step S62 system controller 300 searches all the flags in order from FLAG(1) to FLAG(6) and then FLAG(s). If a flag set to "1" is found, control proceeds to step S63. At step S63, magazine 50 is moved to the position corresponding to the flag which was set to "1." Control then passes to step S55. If all of the flags are set to "0" in step S62, control immediately returns to the MAIN routine of FIG. 10. In the latter case the pressing of the play key is, in effect, ignored.

Once selected first carriage 591 arrives at the playback position and the CENTER input signal has changed to "L," control proceeds to step S57. At step S57 system controller 300 checks the D.DET input again to determine if a disk 201 is present in selected first carriage 591. Note that in step S57 data errors in FLAG(m), caused by weakening of backup power supply 302 or other causes, are corrected to prevent unnecessary operations in the device.

If at step S57, the D.DET input signal is "L," control proceeds to step S58. At step S58, system controller 300 moves tray 20 to the playback position. At step S59 cam member 110 is rotated until it is in the UP range. After the CENTER input signal changes to "L," system controller 300 outputs an "H" level at the REAR signal terminal for 50 msec., braking tray motor 308 to bring it to a halt. If, after the braking, the playback position is over-shot, an "L" signal level is output from the FRONT output terminal and the REAR output is cycled, at a 50% duty cycle with a 10 msec. cycle period, between "H" and "L" to slowly bring selected first carriage 591 to the store position. Once the CENTER input signal changes to "L," "H" levels are output at both the FRONT signal terminal and the REAR signal terminal for 50 msec. to magnetically brake tray motor 308.

Next, system controller 300 outputs an "H" signal level at the ST.DWN output terminal causing magazine 50 to move downwardly. Cam member 110 rotates to move optical mechanism 200 toward the up position. When optical mechanism 200 arrives at the up position and the Pos 1 signal changes to "L," an "H" level is applied by the ST.UP output and magazine motor 316 is thereby magnetically braked for 50 msec. After the braking, control proceeds to step S60 where the disk playback is initiated. At step S61, the MODE variable is set to indicate the "PLAY" mode. Control then returns to the MAIN routine.

Figure 26:
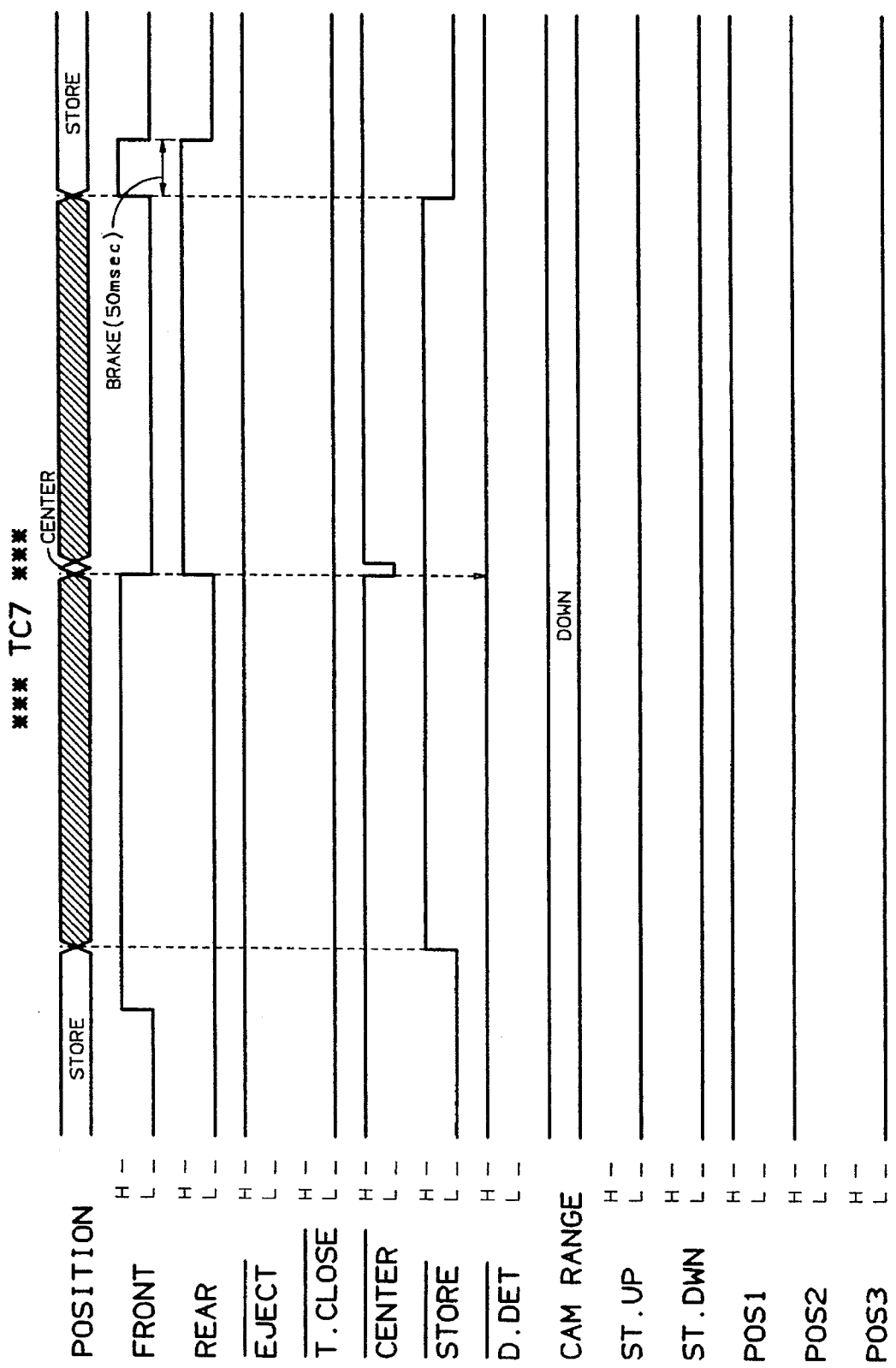
FIG. 26 is a timing chart used in describing the flowchart in FIG. 15.

Referring now also to FIG. 26, if an "H" signal level is detected at the D.DET input terminal in step S57, system controller 300 sets FLAG(m) to "0" at step S64. At step S65 an "L" signal level is applied to the FRONT output and an "H" signal level is applied to the REAR output. Selected first carriage 591 begins to move in the store direction. At step S66 system controller 300 loops until the STORE input signal changes to "L." At step S67, once selected first carriage 591 arrives at the store position and the STORE input signal changes to "L," system controller 300 applies an "H" level to the FRONT output terminal and brakes tray motor 308 for 50 msec. to stop it. After the braking, control proceeds to step S62.

Figure 16:
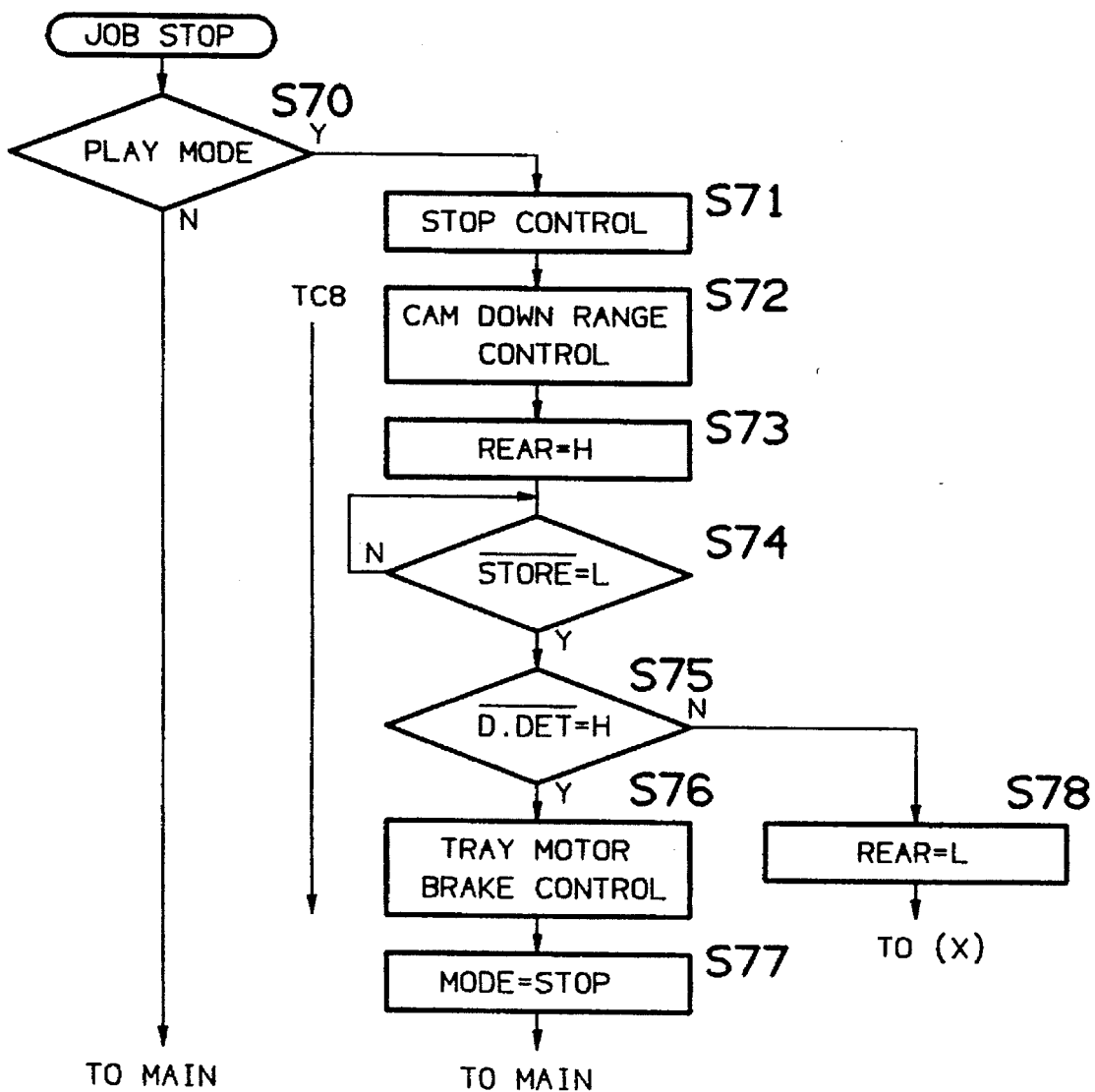
FIG. 16 is a flowchart showing the JOB STOP routine.
Figure 27:
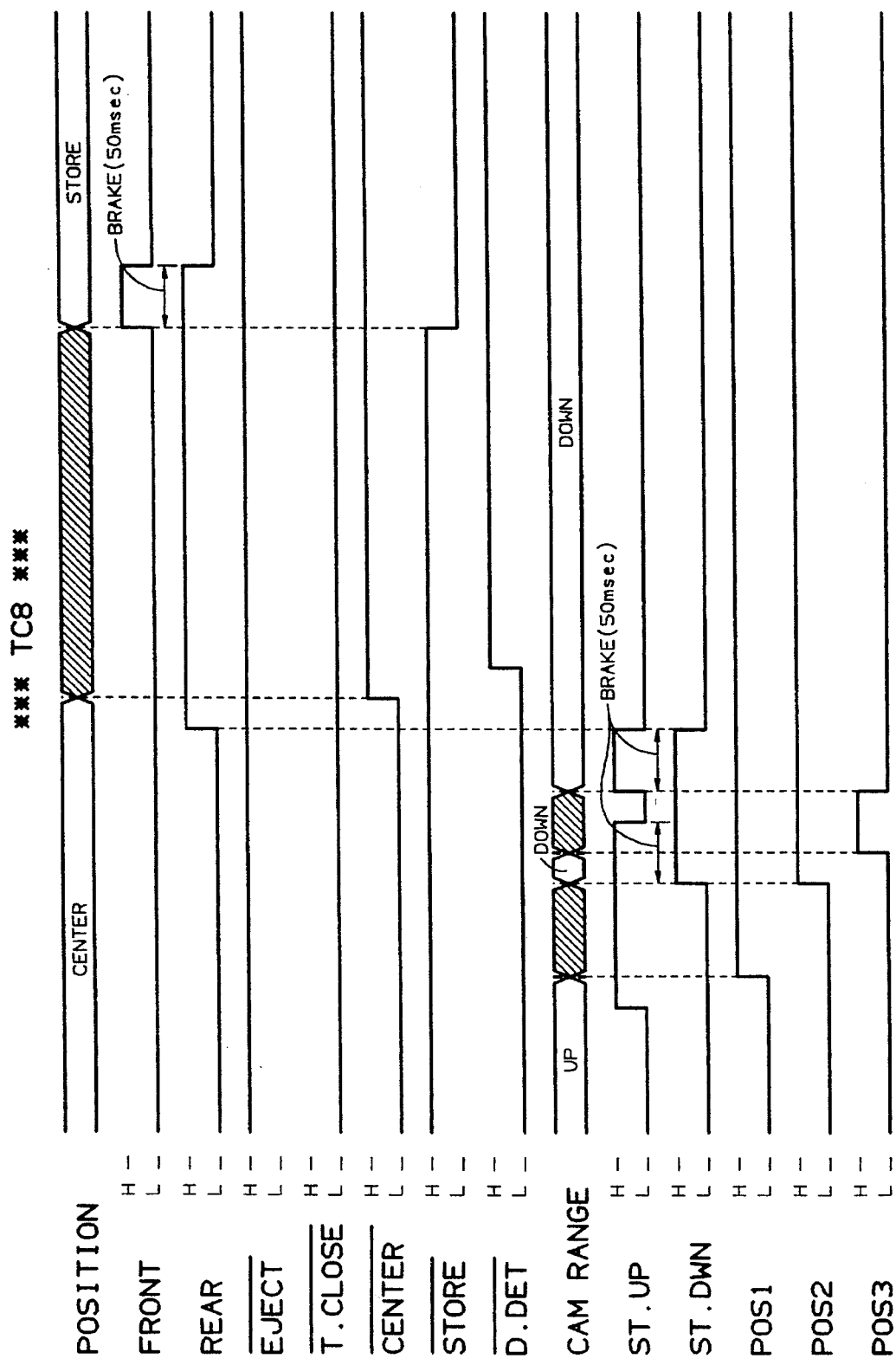
FIG. 27 is a timing chart used in describing the flowchart in FIG. 16.
Figure 28:
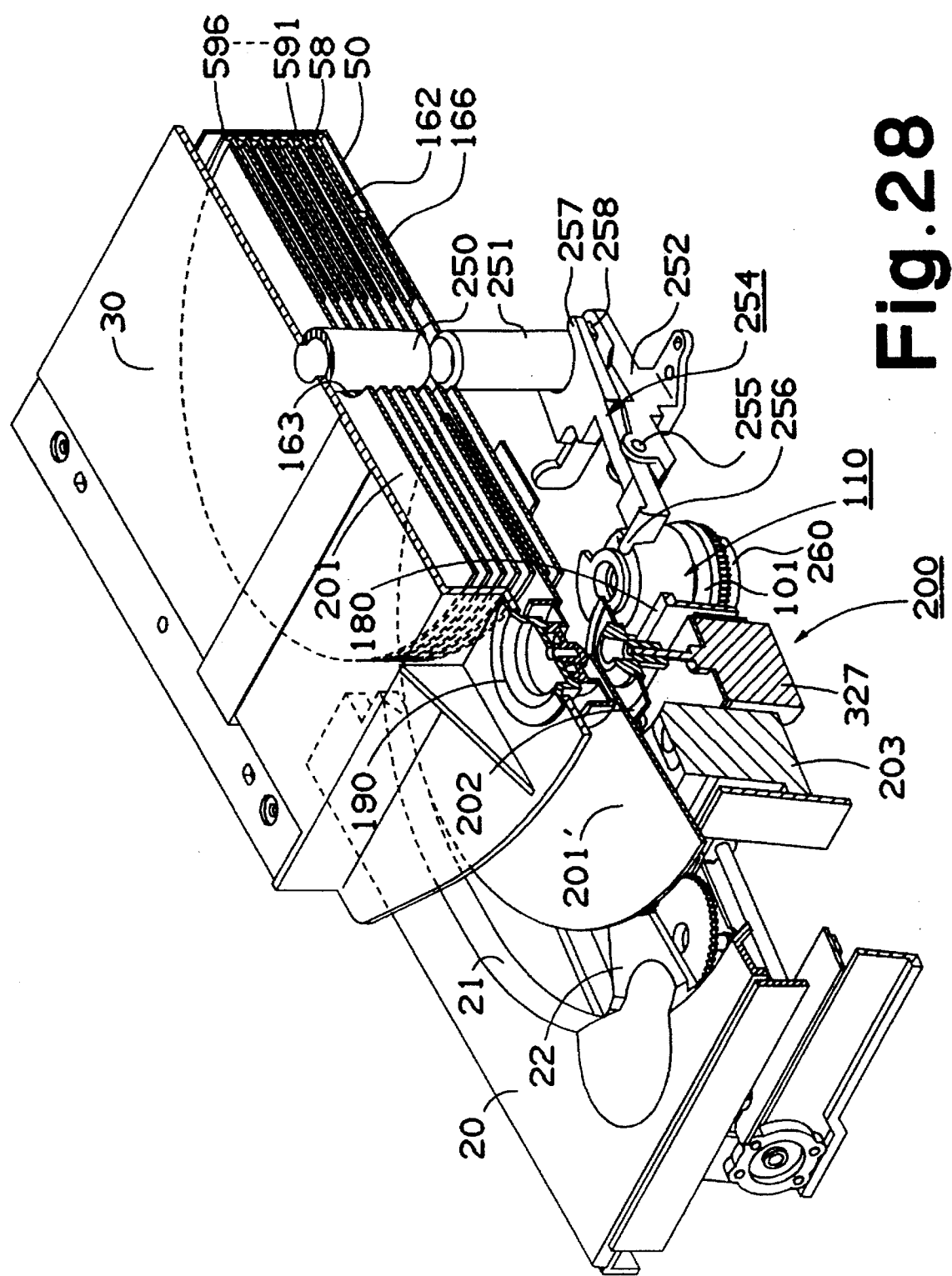
FIG. 28 is a cross-section perspective drawing of the present disk playback device in a position demonstrative of the partially overlapping disk.

Referring now also to FIGS. 16 and 27, when the STOP key is pressed during the "PLAY" mode, system controller 300 proceeds from step S3 of FIG. 10 through steps S70 and S71 of FIG. 16. At step S71, after stopping disk playback, cam member 110 is rotated toward the down range. System controller 300 sets the ST.UP signal to "H" and cam member 110 is rotated to move optical head 203 downwardly. When optical head 203 reaches the down position and the Pos 2 signal changes to "H," the ST.DWN output signal is changed to "H" and magazine motor 316 is thereby magnetically braked for 50 msec. After the braking, if cam member 110 overshoots the down range, "L" is output from the ST.UP signal terminal causing cam member 110 to rotate in reverse. When the Pos 3 signal changes to "L," the ST.DWN signal is changed to "H" for 50 msec. braking magazine motor 316. Then, at step S73 system controller 300 outputs an "H" signal level from the REAR output causing selected first carriage 591 to be moved in the store direction. Control then proceeds to step S74 which loops until the STORE input signal changes to "L."

When selected first carriage 591 arrives at the store position and the STORE input signal changes to "L," control passes to step S75. At step S75 system controller 300 determines if the D.DET input signal is "H" or "L." If D.DET is "H" control proceeds to step S76. At step S76 the FRONT output signal is set to "H" and tray motor 308 is thereby magnetically braked for 50 msec. At step S77 the MODE variable is set to indicate the "STOP" mode and control returns to the MAIN routine. If the D.DET signal is "L" at step S78, system controller 300 sets the REAR output signal to "L," inserts selected first carriage 591 into tray 20 and brings it to eject position according to the flowchart shown in FIG. 12, described above.

Figure 17:
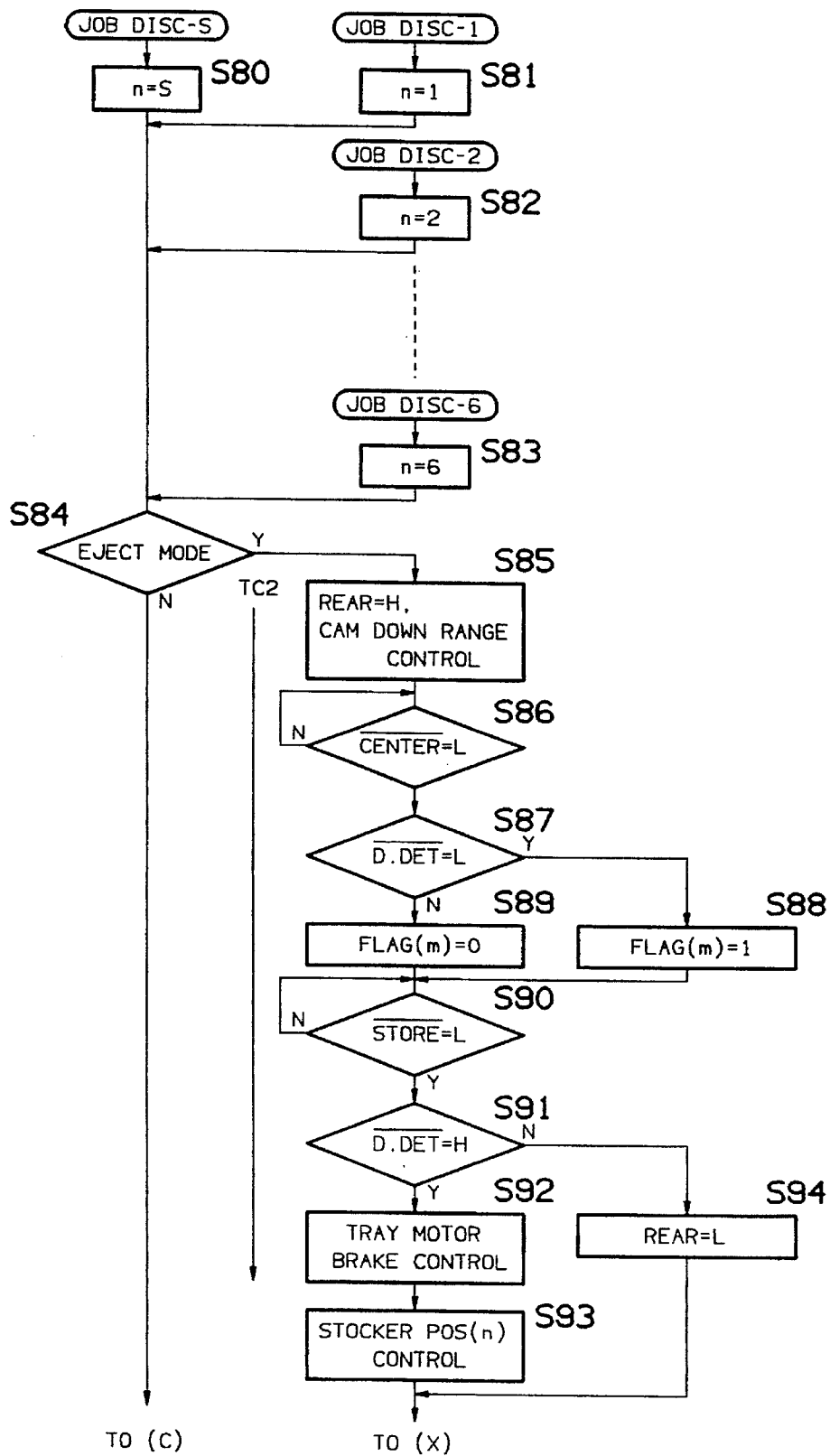
FIG. 17 is a flowchart showing the JOB DISC routine.
Figure 18:
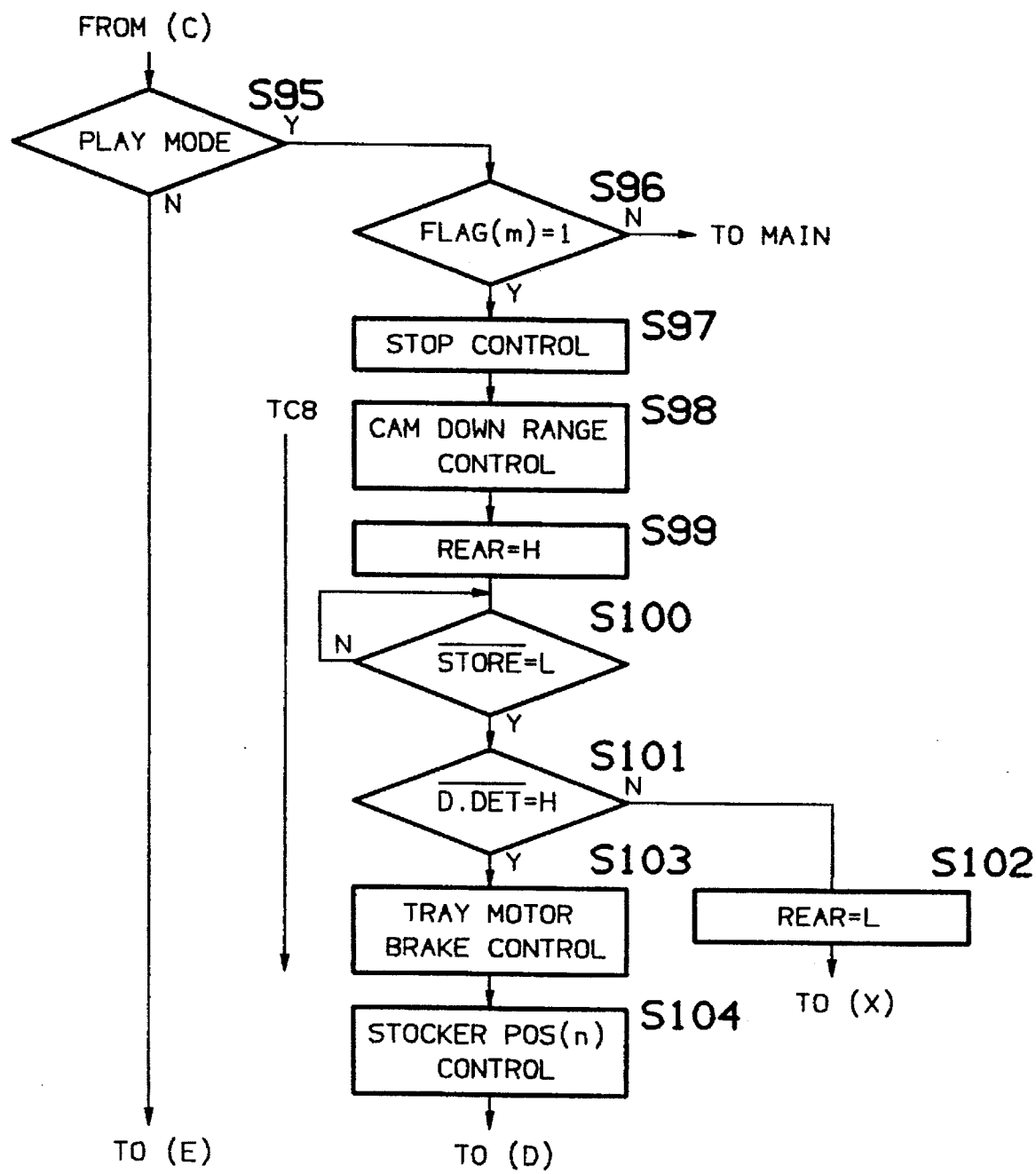
FIG. 18 is a flowchart showing the JOB DISC routine.
Figure 19:
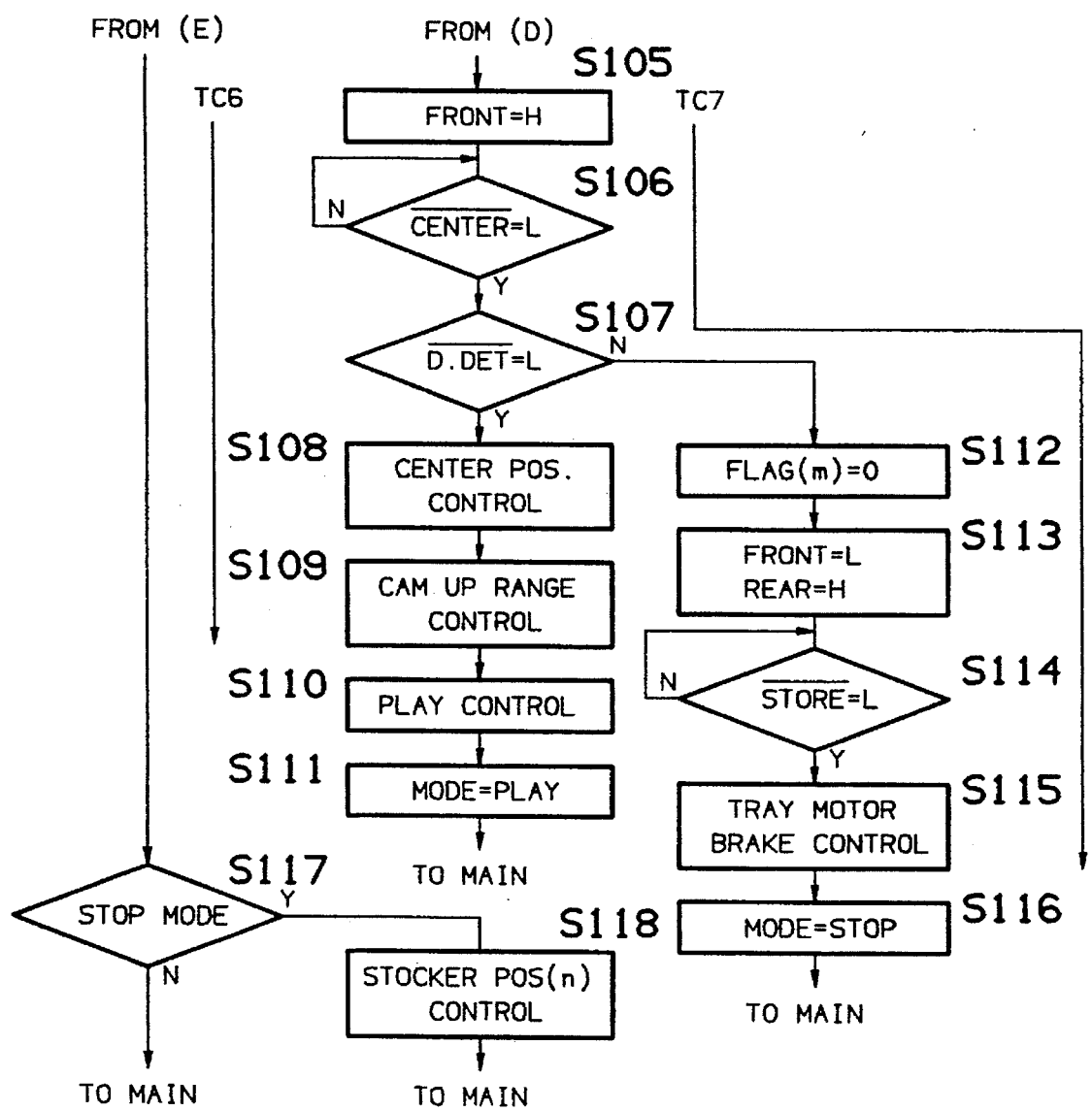
FIG. 19 is a flowchart showing the JOB DISC routine.

Referring now also to FIG. 17, mode control panel 301 includes DISC selection keys (not shown), one for each of the seven storage positions in magazine 50. Referring now also to FIGS. 17–19, when one of the DISC selection keys is pressed during the "EJECT" mode, system controller 300 branches from a corresponding one of steps S4 through S7 of FIG. 10 to a corresponding JOB DISC-N routine (steps S80–S83) shown in FIG. 17, where N is the number of the DISC selection key that is pressed. A constant n is set to "S," "1," "2,"... "6" according to the DISC selection key pressed. Control then proceeds to step S84 and then to step S85. At step S85 an "H" level is output to the REAR output, causing cam member 110 to rotate toward the down range. At step S86, system controller 300 pauses until the CENTER input signal changes to "L."

Once selected first carriage 591 has arrived at the playback position and the CENTER input signal changes to "L," control proceeds to step S87. At step S87, control branches to step S88 if the D.DET input is at level "L" indicating the presence of a disk 201 in selected first carriage 591. At step S88, system controller 300 sets FLAG(n) to "1" which indicates that a disk 201 is present in the $n^{th}$ storage position of magazine 50. FLAG(m) is set to "0" at step S88, if D.DET is at level "H" at step S89. At step S90 system controller 300 pauses until the STORE input signal changes to "L."

Once selected first carriage 591 has arrived at the store position and the STORE input signal has changed to "L," control proceeds to step S91. Control branches from step S91 to step S92 if the D.DET input is at the "H" level. If the D.DET input level is "L," control proceeds to step S94. At step S92 tray motor 308 is magnetically braked for 50 msec. Control proceeds from step S92 to step S93 where magazine 50 is moved to position Pos(n). Carriage 58 is then immediately inserted into tray 20 and brought to the eject position according to the procedure of FIG. 12. At step S94 system controller outputs an "L" level to the REAR output, and proceeds to the procedure of FIG. 12, without moving magazine 50.

Referring now also to FIGS. 18 and 19, when a DISC key is pressed during "PLAY" mode, system controller 300 proceeds from the corresponding JOB DISC routine (the one of S81–S83 corresponding to the key pressed) to step S84. From step S84, control proceeds to step S95 and then to step S96. In step S96, it is determined if FLAG(m), where m is the DISC key number that was pressed, is "1" or "0." If FLAG(m) is "0" control immediately returns to the MAIN routine and the pressing of a DISC key is, in effect, ignored. If FLAG(m) is "1," at step S96, control proceeds to step S97. In step S97, system controller 300 halts disk playback and control passes to step S98. In step S98, cam member 110 is moved toward the down range. At step S99 system controller 300 applies the "H" level to the REAR output. System controller 300 then moves selected first carriage 591 in the store direction. At step S100 system controller 300 loops until the STORE signal to changes to "L."

Once selected first carriage 591 is moved to the store position and the STORE signal changes to "L," control passes to step S101. At step S101 system controller 300 checks the D.DET signal. If the D.DET input is at the "L" level, control proceeds to step S102. At step S102 the "L" level is applied to the REAR output. Selected first carriage 591 is then inserted into tray 20 and brought to the eject position according to the procedure of FIG. 12. If the D.DET signal is determined to be "H" at step S101, control passes to step S103. At step S103 tray motor 308 is magnetically braked. Control proceeds from step S103 to step S104 where magazine 50 is moved to position POS(n).

Next, at step S105 (FIG. 19), system controller 300 applies the "H" level to the FRONT output. Selected first carriage 591 is then moved toward the playback position and control passes to step S106. Control loops at step S106 until the CENTER input signal changes to "L." Once selected first carriage 591 arrives at the playback position and the CENTER input signal changes to "L," control passes to step S108. At step S108 selected first carriage 591 is positioned at the playback position. Control then proceeds to step S109 where cam member 110 is moved toward the UP range. Disk playback is begun at step S110 and, at step S111, the MODE variable is changed to indicate the "PLAY" mode and control returns to the MAIN routine of FIG. 10.

If, at step S107, the D.DET input is determined to be at the "H" level, control passes to step S112. At step S112, system controller 300 changes FLAG(m) to "0." Control then passes to step S113 where the FRONT signal is set to "L." The "H" level is applied to the REAR output and selected first carriage 591 is moved toward the store position. Control proceeds to step S114 where system controller 300 loops until the STORE input signal changes to "L." Once selected first carriage 591 has arrived at the store position and the STORE signal has changed to "L," control passes to step S115. At step S115, system controller 300 brakes tray motor 308 for 50 msec. Then, at step S116, the MODE variable is changed to indicate the "STOP" mode and control returns to the MAIN routine of FIG. 10.

When a DISC key is pressed during the "STOP" mode, system controller 300 proceeds to the appropriate JOB DISC procedure as described above. After setting an internal memory variable n to a value corresponding to the DISC key pressed, control passes through steps S84, S95 and S117 to step S118. At step S118 magazine 50 is moved to position Pos(n), the position corresponding to the key pressed, and control returns to the MAIN routine.

Referring now also to FIG. 20, system controller 300 detects when playback is completed from signal processor circuit 320. When playback is completed, control proceeds from step S8 of FIG. 10 to a JOB NEXT routine shown in FIG. 20. Disk playback is halted at step S120 and control passes to step S121. At step S121, cam member 110 is moved toward the down range. Next, at step S122, system controller 300 outputs the "H" signal level at the REAR output moving selected first carriage 591 toward the store position. Next, at step S123, the routine pauses until the STORE signal changes to "L" indicating the arrival of selected first carriage 591 at the store position.

Once selected first carriage 591 is in the store position, and the STORE input is at the "L" level, control passes to step S124. At step S124 system controller 300 determines the level of the D.DET input signal. If the D.DET input is at the "L" level, then control passes to step S125. At step S125 the "L" level is applied to the REAR output. Next, selected first carriage 591 is inserted into tray 20 and moved to the eject position in accord with the procedure of FIG. 12, after which, control returns to the main routine of FIG. 10. If the D.DET input is at the "H" level at step S124, control passes to step S126 where system controller 300 magnetically brakes tray motor 308. Control then passes to step S127.

At step S127, system controller 300 searches FLAG(m+1) through FLAG(6) and FLAG(S), in sequence. If FLAG(M+1) through FLAG(S) are all set to "0," control passes to step S128. At step S128 system controller 300 sets the MODE variable to indicate the "STOP" mode and control returns to the MAIN routine. If one of FLAG(m+1) through FLAG(S) is set to "1," control passes to step S129. At step S129 system controller 300 moves magazine 50 to the position (Pos(n)) of the first flag found. Next, at step S130, the "H" level is applied to the FRONT output. Next, selected first carriage 591 is moved toward the playback position and control passes to step S131. At step S131 system controller 300 loops until the CENTER input signal changes to "L."

Once selected first carriage 591 arrives at the playback position and the CENTER input signal changes to "L," control passes to step S132. Control then passes from step S132 to step S133 if the D.DET input is at the "L" level, which indicates that disk 201 is present in selected first carriage 591. Control then passes from step S132 to step S137 if the D.DET input is at the "H" level, which indicates that disk 201 is not present in selected first carriage 591. At step S133 system controller 300 precisely positions tray 20 at the playback position. Next, at step S134, cam member 110 rotates toward to the UP range. Next, at step S135, disk playback is begun. Finally, at step S136, the MODE variable is changed to indicate the "PLAY" mode and control returns to the MAIN routine of FIG. 10.

If the D.DET signal is at the "H" level at step S132, indicating that selected first carriage 591 is not occupied by disk 201, control passes to step S137. At step S137 system controller 300 changes FLAG(m) to "0," where m is the number of the selected position of magazine 50. Next, at step S138, the "L" level is applied to the FRONT output and the "H" level applied to the REAR output thus causing selected first carriage 591 to be moved by tray/carriage transport mechanism 309 toward the store position. Control then passes to step S139 where system controller 300 loops until the STORE input signal changes to "L." Once selected first carriage 591 is at the store position and the STORE input signal has changed to "L," control passes to step S140. At step S140 system controller 300 magnetically brakes tray motor 308 for 50 msec. to bring it to a halt. Control then returns to step S127 where the flags are searched as described above.

Various alterations of the embodiment described above may be effected by those of ordinary skill in the art having the benefit of this description without departing from the scope and spirit of the present invention. For example, in the embodiment described above, a disk is transported inside the device while mounted on a carriage. It is noted that the invention may be practiced in a device which moves disks independently of such a supporting element, such as by means of rollers.

In addition, according to the embodiment described above, when a disk remaining in the playback position is detected, the carriage on which the disk is carried is inserted in the tray and brought to the eject position. However, it is noted that it is also possible to provide an error message without moving the carriage. In such a device, only a control signal requesting to eject the carriage would be responded to.

By means of the present invention, damage to disks can be prevented by using a sensor for detecting disks. A disk remaining in the playback position after a carriage is inserted in the store position indicates a problem. In a device such as the present invention, a disk sensor is already provided for the purpose of determining if a given storage position contains a disk. The present invention provides a means for detecting and avoiding a fault in disk transfer using no additional sensor or other elements. In addition, when a disk transfer problem is detected, the selected disk is moved to the eject position, so that the user can correct the problem.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for playing back disks, comprising: carriages;

a magazine for storing said carriages;

each of said carriages having means for carrying at least one of said disks;

means for playing a selected disk at a playback position in a selected carriage of said carriages;

said selected disk at least partly overlapping stored disks carried by carriages stored in said magazine when said selected carriage is in said playback position;

means for moving said magazine relative to said playback position;

means for transporting said selected carriage between said magazine, said playback position, and an eject position whereat access is provided for loading and unloading disks;

means for detecting when another disk and said selected disk are simultaneously carried by said selected carriage;

means for denying entry of said another disk to said magazine as said selected carriage and said selected disk are transported into said magazine, such that said another disk remains in a position between said magazine and said eject position;

said means for detecting sensing said another disk at one of said playback position and said position between said playback position and said eject position, after transporting of said selected carriage at least partially into said magazine; and means, responsive to said means for detecting, for permitting said another disk to be removed from said device.

2. The apparatus as in claim 1, wherein said means for detecting is positioned to detect said another disk while said another disk remains partially overlapping said selected carriage.

3. The apparatus as in claim 2, wherein said means for permitting includes means for transporting said another disk to said eject position.

4. The apparatus as in claim 3, wherein said means for permitting includes means for inhibiting a moving of said magazine relative to said playback position.

5. The apparatus as in as in claim 1, wherein said means for permitting includes means for transporting said another disk to said eject position.

6. The apparatus as in claim 1, wherein said means for permitting includes means for inhibiting a moving of said magazine relative to said playback position.

* * * * *